(12) United States Patent
Farrell

(10) Patent No.: US 6,192,217 B1
(45) Date of Patent: Feb. 20, 2001

(54) UNIVERSAL REPLACEMENT COMMUNICATIONS SATELLITE

(75) Inventor: Jerald F. Farrell, Rancho Palos Verdes, CA (US)

(73) Assignee: AssureSat, Inc., El Segundo, CA (US)

( * ) Notice: Under 35 U.S.C. 154(b), the term of this patent shall be extended for 0 days.

(21) Appl. No.: 09/346,264

(22) Filed: Jul. 1, 1999

(51) Int. Cl.$^7$ ........................................................ H04B 1/00
(52) U.S. Cl. .......................................... 455/13.1; 455/12.1
(58) Field of Search .................................. 455/12.1, 13.1, 455/13.2, 13.3, 427

(56) References Cited

U.S. PATENT DOCUMENTS

| | | |
|---|---|---|
| 3,995,801 | 12/1976 | Bond . |
| 4,502,051 | 2/1985 | Dondl . |
| 4,688,259 | 8/1987 | Edridge . |
| 4,858,225 | 8/1989 | deSantis . |
| 4,965,587 | 10/1990 | Lenormand et al. . |
| 5,020,746 | 6/1991 | Anzel . |
| 5,120,007 | 6/1992 | Pocha et al. . |
| 5,175,556 | 12/1992 | Berkowitz . |
| 5,271,482 * | 12/1993 | Perkins et al. ........................ 244/158 |
| 5,289,193 | 2/1994 | Lenormand et al. . |
| 5,297,134 | 3/1994 | Takahashi et al. . |
| 5,323,322 | 6/1994 | Mueller et al. . |
| 5,355,138 | 10/1994 | Cances et al. . |
| 5,410,731 | 4/1995 | Rouffet et al. . |
| 5,523,997 | 6/1996 | Bishop, Jr. . |
| 5,563,880 | 10/1996 | Sabourin et al. . |
| 5,779,195 * | 7/1998 | Basuthakur et al. ................. 244/161 |
| 5,813,634 | 9/1998 | Pizzicaroli et al. . |
| 5,860,056 | 1/1999 | Pond . |
| 5,890,679 | 4/1999 | Chethik . |
| 5,896,558 * | 4/1999 | Wiedeman ........................... 455/12.1 |
| 5,929,804 * | 7/1999 | Jones et al. ........................... 342/354 |
| 5,978,370 * | 11/1999 | Shivly ................................... 370/370 |

FOREIGN PATENT DOCUMENTS

| | | |
|---|---|---|
| 0 915 529 A1 | 5/1999 | (EP) . |
| WO 98/04017 | 1/1998 | (WO) . |

OTHER PUBLICATIONS

F. Rispoli: "Reconfigurable Satellite Antennas: A Review," *Electronic Engineering*, vol. 61, No. 748, p. S22–S27 (Apr. 1989).
Electronics Engineers' Handbook, Section 22–63, "Satellite Communications Systems," pp. 22–61 to 22–62 (1975).

* cited by examiner

Primary Examiner—Reinhard J. Eisenzopf
Assistant Examiner—Makoto Aoki
(74) Attorney, Agent, or Firm—Bryan Cave LLP

(57) ABSTRACT

A practicable universal replacement C band/Ku band communications satellite designed for orbiting the Earth in a storage orbit and a method for its use as a replacement for a failed satellite are disclosed. The universal replacement satellite can be controlled by an external control system (e.g., a ground station) and is reconfigurable by remote command (e.g., from a ground station). The satellite is designed to make several fast moves during its design life from its storage slot to the geostationary slot to which it needs to move when it is to act as a replacement for a failed satellite. The ability to make fast moves helps minimize down time. After its then-current mission of sparing a particular failed satellite has been completed, the communications payload can be turned off and the satellite can be moved back to its storage slot to await its next replacement mission. Various design features allow it to be able to satisfactorily mimic (that is, emulate) the communications capabilities of a very high percentage of the existing geostationary C band and Ku band satellites while still being economically and otherwise practicable. The satellite can also contain means for handling BSS signals so that the satellite can act as a replacement for both FSS and BSS failed satellites.

68 Claims, 4 Drawing Sheets

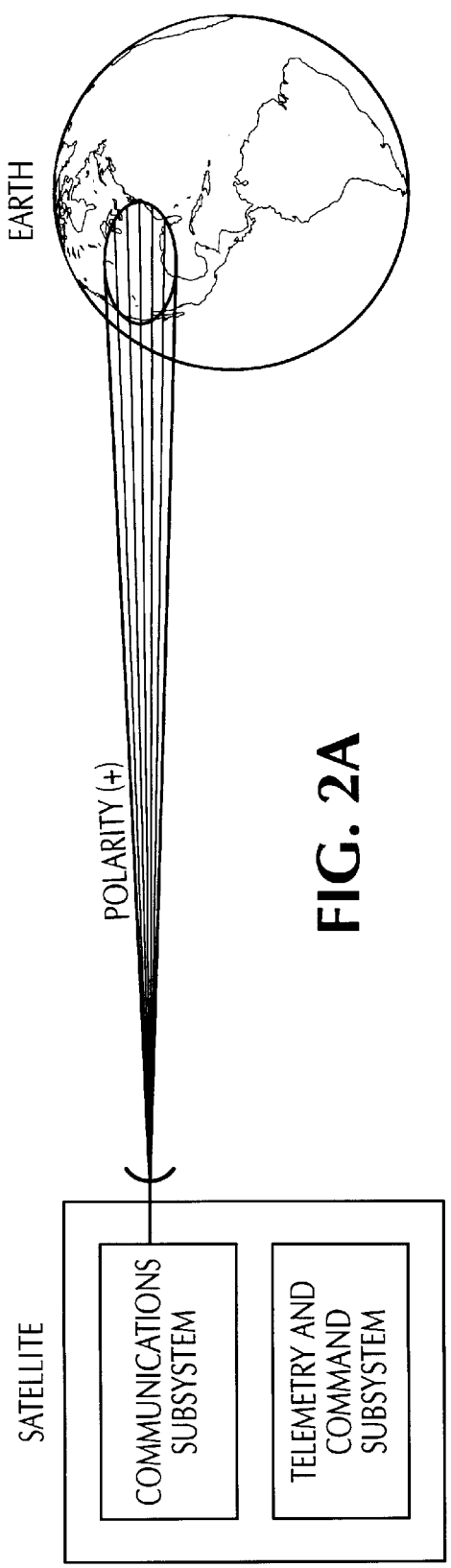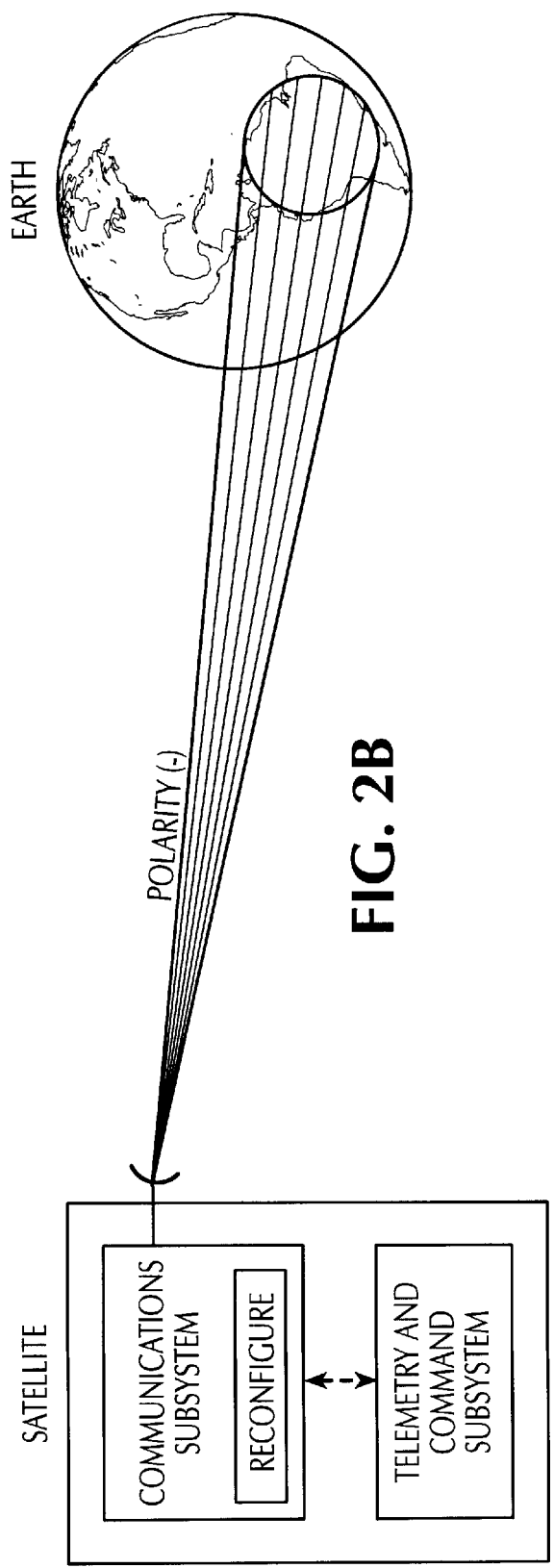
FIG. 2A
FIG. 2B

UNIVERSAL REPLACEMENT COMMUNICATIONS SATELLITE

BACKGROUND OF THE INVENTION

1. Technical Field

This invention concerns the field of communication satellites and, more specifically, the problem of providing a practicable satellite that is capable of acting as a satisfactory replacement satellite for the majority of Fixed Satellite Service ("FSS") communications satellites that are in orbit and desirably also for the majority of such satellites that are to be placed in orbit.

2. Background

Communications (or telecommunications) satellites have been used for many years. Uplink signals are sent by one or more Earth stations, received by one or more uplink antennas on the satellite, processed by circuitry in the satellite (e.g., frequency-shifted and amplified), sent back (retransmitted) to Earth by one or more downlink antennas on the satellite, and received by one or more Earth stations. The satellites may be placed in various orbits around the Earth. One particularly desirable orbit for certain communications satellites is an equatorial orbit (that is, substantially in the plane of Earth's equator) at an altitude of approximately 22,300 miles. In that orbit at that altitude, the period of revolution of the satellite around the Earth is equal to the period of rotation of the earth. Accordingly, transmitting (uplink) and receiving (downlink) stations on Earth "see" the satellite remaining at a fixed point in the sky and, thus, the satellite may be considered to be in a geosynchronous equatorial orbit or to be geostationary. As a result, a geostationary satellite's position can be defined by its equatorial longitude. For example, satellites useful for broadcast to the continental United States and its territories may be located from about 69 degrees west longitude to about 139 degrees west longitude.

One advantage of using a geostationary satellite is that the transmitting and receiving stations on Earth do not need to track a satellite in a preselected orbital slot across the sky to maintain the desired uplink and downlink communications characteristics (strength of the signals received by the satellite, footprint of the downlink signals on Earth, etc.). In other words, the antennas on a geostationary satellite can be fixed (or stationary) and the footprints of the downlink antennas can also be fixed.

In addition to typically having fixed antennas, geostationary satellites also typically are designed to receive certain signals on preselected frequency bands (the uplink bands) from one or more preselected geographic areas on Earth according to the uplink frequency plan, to amplify the signals to the desired power level, and to retransmit them down to Earth on other preselected frequency bands (the downlink bands) to one or more preselected geographic areas on Earth according to the downlink frequency plan.

Unfortunately, as is well-known, there is a significant probability of a malfunction or complete failure during the launch sequence, and even after a successful launch, there may be a problem while trying to deploy the satellite in the desired orbital position (slot). Failures may also occur after the satellite has been successfully positioned in its slot and operated for a period of time. Failures include sudden or gradual, partial or complete loss of telecommunications capability.

In view of the serious economic loss that can result from not having a fully and properly functioning telecommunications satellite operating in its slot throughout the entire expected time period, it is desirable to provide a replacement satellite (i.e., a spare or back-up satellite) that can assume the telecommunications functions of a failed satellite. Replacement satellites may be stored in orbit or on the ground, and each mode of storage has advantages and disadvantages. Regardless of which storage mode is used, because of cost, weight, and other considerations, the replacement satellite will typically be designed for the same uplink and downlink frequency plans, power levels, footprints, telemetry and command subsystem frequencies, etc. as of the satellite for which it is designed to be the spare.

The substantial cost of spare satellites represents a significant expense for providers of satellite communications channels (e.g., organizations owning satellites and leasing their channels for retransmission). That is particularly true because the spare may not ever be needed. Therefore, it would be highly advantageous if such providers could avoid or at least substantially reduce that expense.

Various methods of providing spares have been proposed. See, e.g., U. S. Pat. Nos. 3,995,801, 5,120,007, and 5,813,634. Other documents concerning or mentioning spare satellites, back-up coverage, and/or replacing a failing or failed satellite include U.S. Pat. Nos. 4,502,051, 5,289,193, 5,410,731, and PCT WO 98/04017. Other documents concerning communication satellites, communication systems comprising constellations of satellites, communication satellite subsystems and components thereof, and methods of operating communication satellites and systems include U.S. Pat. Nos. 4,688,259; 4,858,225; 4,965,587; 5,020,746; 5,175,556; 5,297,134; 5,323,322; 5,355,138; 5,523,997; 5,563,880; 5,860,056; and 5,890,679; EPO Published Application EP 0 915 529 A1; F. Rispoli, "Reconfigurable Satellite Antennas: A Review," *Electronic Engineering,* volume 61, number 748, pages S22–S27 (April 1989); and *Electronics Engineers' Handbook,* Section 22–63, "Satellite Communications Systems," pages 22–61 to 22–62 (1975). (All of the foregoing documents and any other documents discussed or otherwise referenced herein are incorporated herein in their entireties for all purposes.)

Some of those documents concern movable antennas. See, e.g., EP 0 915 529 A1.

Some of those documents concern reconfigurable satellites. See, e.g., U.S. Pat. Nos. 4,688,259; 4,858,225; 4,965,587; 5,175,556; 5,289,193; 5,355,138; PCT WO 98/04017; EP 0 915 529 A1; and F. Rispoli: "Reconfigurable Satellite Antennas: A Review," *Electronic Engineering,* volume 61, number 748, pages S22–S27 (April 1989). Some of those documents concern moving satellites, e.g., from one slot to another or for station-keeping. See, e.g., U.S. Pat. Nos. 5,020,746; 5,813,634; and PCT WO 98/04017.

Replacement satellites that are essentially perfect spares (or clones) for essentially all FSS (C band/Ku band) communications satellites may have been considered by others, but, as far as is known, were never built, probably because they were impractical and/or were prohibitively expensive. The problem of providing such a satellite is made all the more complicated by the fact that the conventional C band/Ku band communications satellites have widely differing characteristics concerning, for example, the uplink and downlink communications frequencies used, power levels, and coverage patterns. Furthermore, conventional satellites well before being launched and put in orbit have been designed for particular orbital slots having neighboring satellites with known telemetry and command frequencies and other characteristics.

Accordingly, there has been a long-standing need for practicable but satisfactory replacement satellites for C band/Ku band communications satellites (FSS satellites). In other words, there has been a long-standing need for practicable C band/Ku band replacement satellites that can emulate the performance of a substantial percentage (and preferably a very high percentage) of orbiting C band/Ku band communications satellites while still being technologically, economically, and otherwise practicable.

SUMMARY OF THE INVENTION

Such satellites having those features and advantages, as well as other features and advantages that will be apparent to those skilled in the art, have now been developed. Broadly, in one aspect this invention concerns a universal replacement communications satellite designed for orbiting the Earth in a geostationary orbit, which can be controlled by an external control system, which is reconfigurable, and which can emulate the communications performance of a substantial percentage of existing geostationary C band and Ku band communications satellites and therefore for which it can be a replacement, the universal replacement satellite being designed to receive uplink C band and Ku band signals and to output C band and Ku band downlink signals, the universal replacement communications satellite comprising:

(a) Ku band processing means for (i) receiving Ku band uplink signals in the channels of three 250 MHz uplink bands of 13.75–14.00 GHz, 14.00–14.25 GHz, and 14.25–14.50 GHz, each uplink band having a plurality of uplink Ku band channels, (ii) amplifying the signals, (iii) down converting their frequencies, and (iv) outputting any of those amplified, reduced-frequency Ku band signals as Ku band downlink signals in the channels of any of six 250 MHz bands within the 10.95–11.20 GHz, 11.45–11.70 GHz, 11.70–12.20 GHz, and 12.25–12.75 GHz downlink Ku bands, each downlink Ku band having a plurality of downlink Ku band channels;

(b) two or more Ku band downlink antennas, each antenna capable of outputting a downlink beam comprising Ku band downlink signals, each downlink beam being separately directable to different locations on Earth;

(c) means for directing the Ku band downlink signals to any one of the two or more Ku band downlink antennas;

(d) C band processing means for (i) receiving C band uplink signals in the channels of two uplink bands of about 5.925 to 6.425 GHz and 6.425 to 6.725 GHz, each uplink band having a plurality of uplink C band channels, (ii) amplifying the signals, (iii) down converting their frequencies, and (iv) outputting those amplified, reduced-frequency C band signals as C band downlink signals in the channels of the 3.70–4.20 GHz and 3.40–3.70 GHz downlink C bands, each downlink C band having a plurality of downlink C band channels;

(e) two or more C band downlink antennas, each antenna capable of outputting a downlink beam comprising downlink C band signals, each downlink beam being separately directable to different locations on Earth;

(f) means for directing the C band downlink signals to any one of the two or more C band downlink antennas;

(g) a propulsion subsystem designed to allow the satellite to make at least three fast moves, each of at least three degrees per day, during the design life of the satellite;

(h) a power subsystem to provide electrical power for satellite operation;

(i) a telemetry and command subsystem to allow the satellite to monitor itself and for communicating with the external control system, the subsystem comprising a telemetry sub-subsystem that can transmit on at least two different frequencies and a command sub-subsystem that can receive on at least two different frequencies;

(j) an attitude and orbit control subsystem for helping to properly orient the satellite with respect to Earth;

(k) a thermal control subsystem for helping to maintain the satellite within the proper temperature range for operation; and (l) means to reconfigure the satellite, said means comprising (i) means to remotely adjust the Ku band processing means to direct a bundle of at least two but of fewer than all of the signals in each of the uplink Ku bands to any one of the downlink Ku bands, (ii) means to remotely adjust the downlink beam from at least one of the Ku band downlink antennas to direct the beam to different locations on Earth, (iii) means to remotely adjust the downlink beam from at least one of the C band downlink antennas to direct the beam to different locations on Earth, (iv) means to remotely change the footprint of the downlink beam from at least one of the downlink antennas, and (v) means to remotely change the polarity of at least one of the downlink antennas.

In another aspect this invention concerns a universal replacement communications satellite designed for orbiting the Earth in a geostationary orbit, which can be controlled by an external control system, which is reconfigurable, and which can emulate the communications performance of a substantial percentage of existing geostationary C band and Ku band communications satellites and therefore for which it can be a replacement, the universal replacement satellite being designed to receive uplink C band and Ku band signals and to output C band and Ku band downlink signals, the universal replacement communications satellite comprising:

(a) Ku band processing means for (i) receiving Ku band uplink signals in the channels of three 250 MHz uplink bands of 13.75–14.00 GHz, 14.00–14.25 GHz, and 14.25–14.50 GHz, each uplink band having a plurality of uplink Ku band channels, (ii) amplifying the signals, (iii) down converting their frequencies, and (iv) outputting any of those amplified, reduced-frequency Ku band signals as Ku band downlink signals in the channels of any of six 250 MHz bands within the 10.95–11.20 GHz, 11.45–11.70 GHz, 11.70–12.20 GHz, and 12.25–12.75 GHz downlink Ku bands, each downlink Ku band having a plurality of downlink Ku band channels;

(b) two or more Ku band downlink antennas, each antenna capable of outputting a downlink beam comprising Ku band downlink signals, each downlink beam being separately directable to different locations on Earth;

(c) means for directing the Ku band downlink signals to any one of the two or more Ku band downlink antennas;

(d) C band processing means for (i) receiving C band uplink signals in the channels of two uplink bands of about 5.925 to 6.425 GHz and 6.425 to 6.725 GHz, each uplink band having a plurality of uplink C band channels, (ii) amplifying the signals, (iii) down converting their frequencies, and (iv) outputting those amplified, reduced-frequency C band signals as C band downlink signals in the channels of the 3.70–4.20 GHz and 3.40–3.70 GHz downlink C bands, each downlink C band having a plurality of downlink C band channels;

(e) two or more C band downlink antennas, each antenna capable of outputting a downlink beam comprising downlink C band signals, each downlink beam being separately directable to different locations on Earth;

(f) means for directing the C band downlink signals to any one of the two or more C band downlink antennas;

(g) a propulsion subsystem designed to allow the satellite to make at least three fast moves during the design life of the satellite;

(h) a power subsystem to provide electrical power for satellite operation;

(i) a telemetry and command subsystem to allow the satellite to monitor itself and for communicating with the external control system;

(j) an attitude and orbit control subsystem for helping to properly orient the satellite with respect to Earth;

(k) a thermal control subsystem for helping to maintain the satellite within the proper temperature range for operation; and (l) means to reconfigure the satellite.

In another aspect this invention concerns a universal replacement communications satellite designed for orbiting the Earth in a geostationary orbit, which can be controlled by an external control system, which is reconfigurable, and which can emulate the communications performance of a substantial percentage of existing geostationary C band and Ku band communications satellites and therefore for which it can be a replacement, the universal replacement satellite being designed to receive uplink C band and Ku band signals and to output C band and Ku band downlink signals, the universal replacement communications satellite comprising:

(a) Ku band processing means for (i) receiving Ku band uplink signals in the channels of three uplink bands, each uplink band having a plurality of uplink Ku band channels, (ii) amplifying the signals, (iii) down converting their frequencies, and (iv) outputting any of those amplified, reduced-frequency Ku band signals as Ku band downlink signals in the channels of any of at least four downlink Ku bands, each downlink Ku band having a plurality of downlink Ku band channels;

(b) two or more Ku band downlink antennas, each antenna capable of outputting a downlink beam comprising Ku band downlink signals, each downlink beam being separately directable to different locations on Earth;

(c) means for directing the Ku band downlink signals to any one of the two or more Ku band downlink antennas;

(d) C band processing means for (i) receiving C band uplink signals in the channels of at least one uplink band, each uplink band having a plurality of uplink C band channels, (ii) amplifying the signals, (iii) down converting their frequencies, and (iv) outputting those amplified, reduced-frequency C band signals as C band downlink signals in the channels of at least one downlink C band, each downlink C band having a plurality of downlink C band channels;

(e) one or more C band downlink antennas, each antenna capable of outputting a downlink beam comprising downlink C band signals, each downlink beam being separately directable to different locations on Earth;

(f) means for directing the C band downlink signals to any one of the one or more C band downlink antennas;

(g) a propulsion subsystem designed to allow the satellite to make at least two fast moves during the design life of the satellite;

(h) a power subsystem to provide electrical power for satellite operation;

(i) a telemetry and command subsystem to allow the satellite to monitor itself and for communicating with the external control system, the subsystem comprising a telemetry sub-subsystem that can transmit on at least two different frequencies and a command sub-subsystem that can receive on at least two different frequencies;

(j) an attitude and orbit control subsystem for helping to properly orient the satellite with respect to Earth;

(k) a thermal control subsystem for helping to maintain the satellite within the proper temperature range for operation; and (l) means to reconfigure the satellite, said means comprising (i) means to remotely adjust the Ku band processing means to direct a bundle of at least two but of fewer than all of the signals in each of the uplink Ku bands to any one of the downlink Ku bands, (ii) means to remotely adjust the downlink beam from at least one of the Ku band downlink antennas to direct the beam to different locations on Earth, (iii) means to remotely adjust the downlink beam from at least one of the one or more C band downlink antennas to direct the beam to different locations on Earth, (iv) means to remotely change the footprint of the downlink beam from at least one of the downlink antennas, and (v) means to remotely change the polarity of at least one of the downlink antennas.

In some of the preferred embodiments, the C band processing means can output the amplified, reduced-frequency C band signals as C band downlink signals in the channels of either of the 3.70–4.20 GHz and 3.40–3.70 GHz downlink C bands; the Ku band processing means can direct some but not all of the signals in one of the Ku uplink bands to any one of the six 250 MHz downlink Ku bands and can direct other signals in that one of the Ku uplink bands to the same or a different one of the six downlink Ku bands; the means to remotely adjust the Ku band processing means to direct the signals comprises means to remotely adjust the Ku band processing means to change the frequencies to which the signals are down converted; the means for down converting the signals comprises, for example, a frequency synthesizer or fixed oscillators; the satellite has at least two uplink C band antennas and at least two uplink Ku band antennas and all of the uplink antennas are independently steerable to different locations on Earth; the uplink antennas also function as the downlink antennas; the satellite is designed so that at the start of its design life, the signals of at least thirty-two uplink Ku band channels can be processed by the Ku band processing means and the signals of at least thirty-two uplink C band channels can be processed by the C band processing means; the satellite is designed so that at the end of its design life, the signals of at least twenty-four uplink Ku band channels can be processed by the Ku band processing means and the signals of at least twenty-four uplink C band channels can be processed by the C band processing means; the satellite has means to remotely change the polarity of at least one of the downlink antennas and those means comprise means to remotely change the polarity from linear to circular or vice versa, and/or from vertical to horizontal or vice versa, and/or from clockwise to counterclockwise or vice versa; the means to reconfigure the satellite includes means to remotely adjust the Ku band processing means to direct a bundle of fewer than all of the signals in each of the uplink Ku bands to any one of the downlink Ku bands, for example, two, three, six, or a different number of signals; the satellite has means to remotely change the footprint of the downlink beam from at least one of the Ku band downlink antennas and from at least one of the C band downlink antennas; the downlink beam from at least one of the downlink antennas is independently directable to different locations on Earth; the satellite is designed so that it can make a minimum of three fast moves, each of at least five degrees per day, during the design life of the satellite; the telemetry and command subsystem comprises a telemetry sub-subsystem that can transmit on at least two (preferably four) different frequencies and a command sub-subsystem that can receive on at least two (preferably four) different frequencies; some (or more preferably all) of the Ku band channels are of a standard bandwidth and the standard bandwidth is nominally 36 MHz (which includes some of the channels being 35 MHz wide); and the replacement satellite further comprises BSS band processing means comprising means for (i) receiving BSS uplink signals at frequencies ranging from 17.3 GHz to 18.1 GHz, (ii) amplifying the BSS signals, (iii) down converting their frequencies, and (iv) outputting those amplified, reduced-frequency BSS band signals as BSS downlink signals in the channels of the bands provided for downlink Ku band signals.

In another aspect, the invention concerns a method for replacing a geostationary communications satellite handling C band and Ku band signals, the method comprising providing the universal replacement communications satellite of this invention, placing the replacement satellite in a suitable geostationary slot, and reconfiguring the satellite to emulate the communications performance of the satellite being replaced. The method preferably further includes placing the replacement satellite in a storage orbit whose plane typically will be inclined with respect to the orbital plane of the geostationary slot and moving the replacement satellite from its storage orbit to the suitable geostationary slot by means of a combined drift and inclination maneuver.

Other features and advantages of the invention will be apparent to those skilled in the art from this disclosure.

BRIEF DESCRIPTION OF THE DRAWINGS

To facilitate further discussion of the invention, the following drawings are provided in which:

FIG. 2A shows in schematic form a downlink beam from one of the antennas of the satellite aimed at North America, the beam having a given footprint and a given polarity.

FIG. 2B shows in schematic form the telemetry and command subsystem causing reconfiguration of the communications subsystem to direct the downlink beam from the antenna to South America and to have a different footprint and a different polarity.

DETAILED DESCRIPTION OF THE INVENTION

Figure 1:
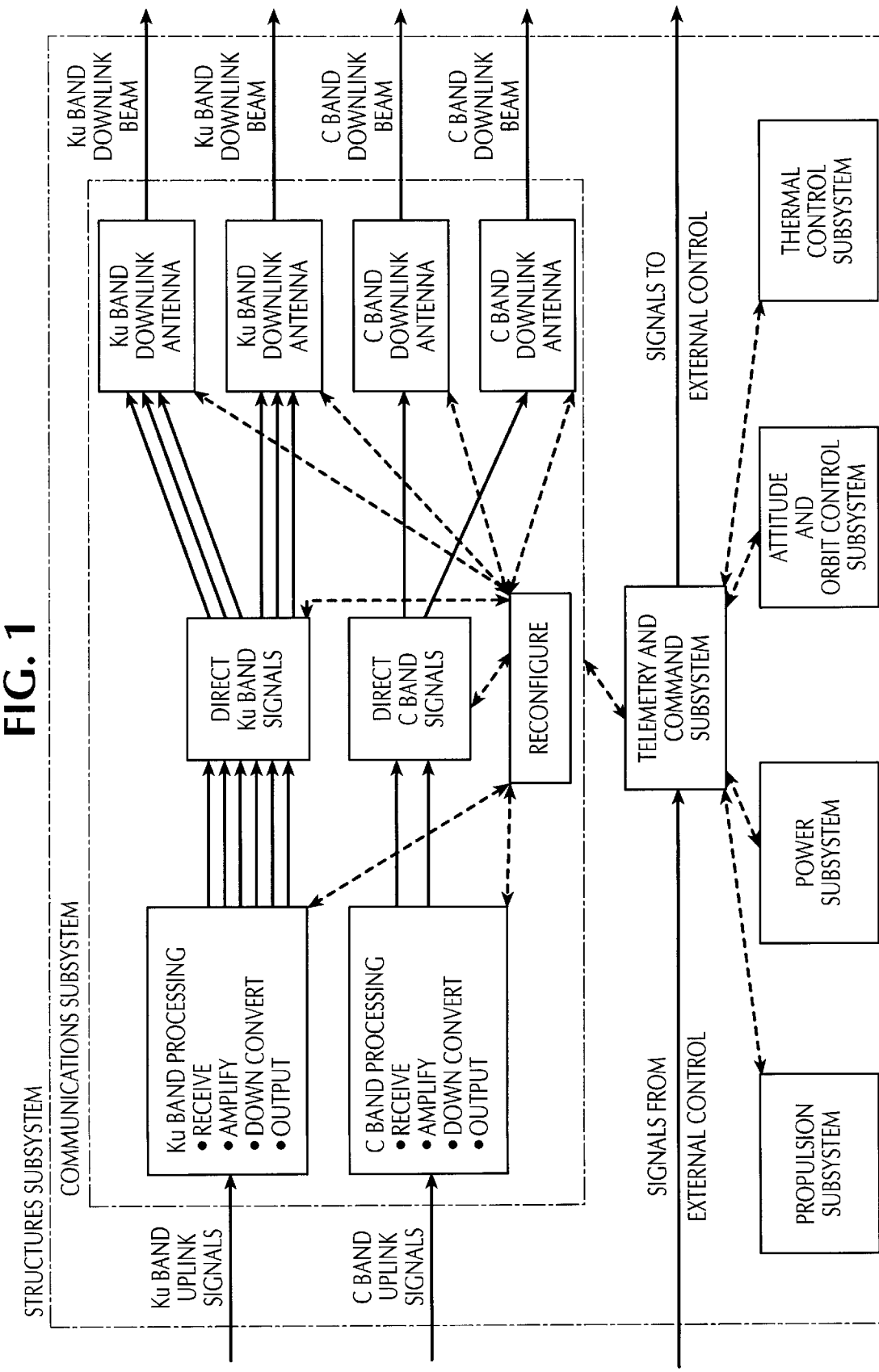
FIG. 1 is a block diagram of a satellite of the invention showing its subsystems (structures, power, thermal control, attitude and orbit control, propulsion, telemetry and command, and communications), some of the relationships between the subsystems, and some of the functionalities. In the communications subsystem, uplink C band and Ku band signals are received, amplified, down converted, output by their respective processors, and directed to the appropriate antennas, which send the downlink beams. The telemetry and command subsystem communicates with the external control system and with other subsystems within the satellite.
Figure 3A:
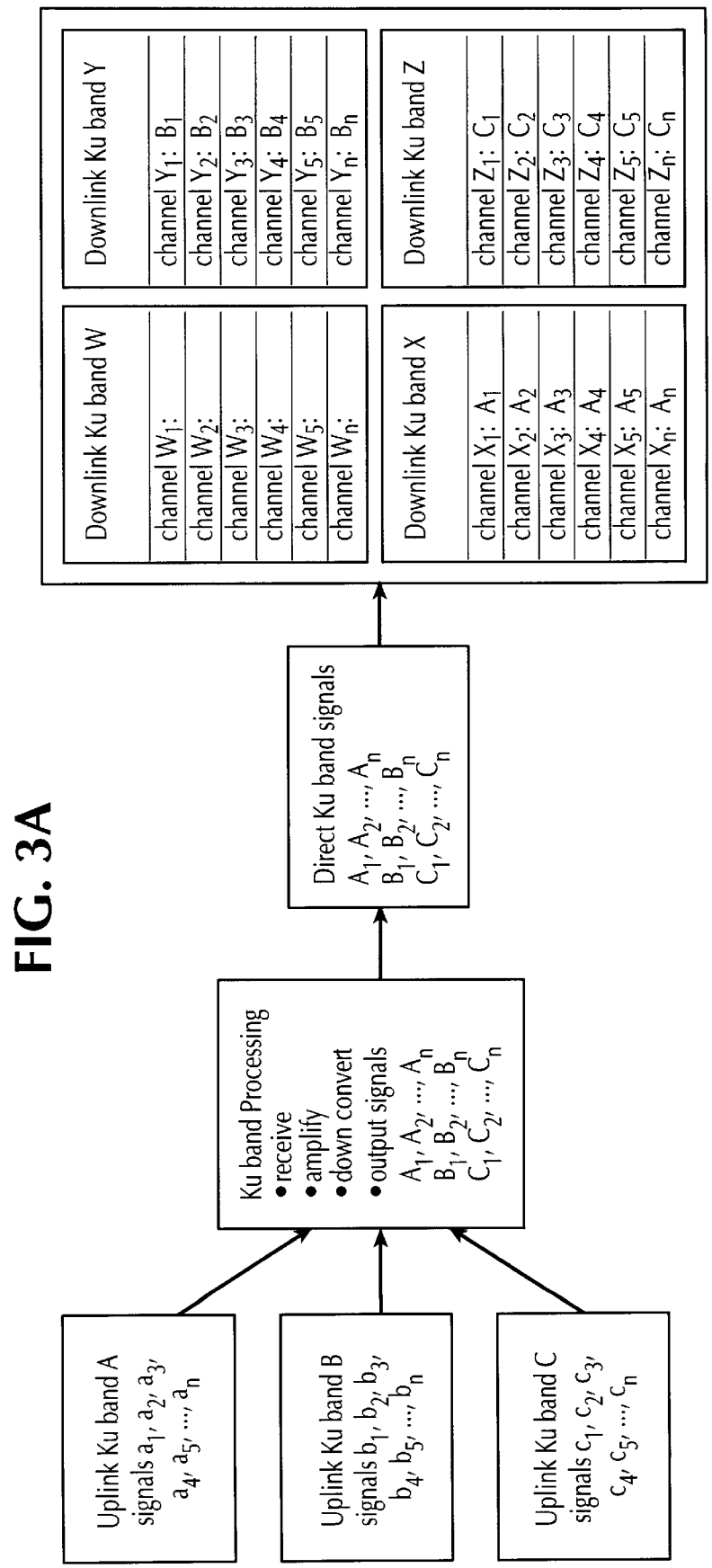
FIG. 3A shows in schematic form uplink Ku band signals in three bands, for convenience referred to as bands A, B, and C, containing signals, for convenience referred to as signals $a_1, a_2, a_3, a_4, a_5, \ldots, a_n$ (in band A), signals $b_1, b_2, b_3, b_4, b_5, \ldots, b_n$ (in band B), and signals $c_1, c_2, c_3, c_4, c_5, \ldots, c_n$ (in band C), being received, amplified, down converted, output as signals $A_1, A_2, A_3, A_4, A_5, \ldots, A_n$, signals $B_1, B_2, B_3, B_4, B_5, \ldots, B_n$, and signals $C_1, C_2, C_3, C_4, C_5, \ldots, C_n$, respectively, and directed to downlink Ku bands, for convenience referred to as bands W, X, Y, and Z, which downlink Ku bands contain channels $W_1, W_2, W_3, W_4, W_5, \ldots, W_n$ (in band W), channels $X_1, X_2, X_3, X_4, X_5, \ldots, X_n$ (in band X), channels $Y_1, Y_2, Y_3, Y_4, Y_5, \ldots, Y_n$ (in band Y), and channels $Z_1, Z_2, Z_3, Z_4, Z_5, \ldots, Z_n$ (in band Z). In the satellite configuration of FIG. 3A, signals $A_1, A_2, A_3, A_4, A_5, \ldots, A_n$ have been directed to downlink channels $X_1, X_2, X_3, X_4, X_5, \ldots, X_n$, respectively, in downlink Ku and X, signals $B_1, B_2, B_3, B_4, B_5, \ldots, B_n$ have been directed to downlink channels $Y_1, Y_2, Y_3, Y_4, Y_5, \ldots, Y_n$, respectively, in downlink Ku band Y, and signals $C_1, C_2, C_3, C_4, C_5, \ldots, C_n$ have been directed to downlink channels $Z_1, Z_2, Z_3, Z_4, Z_5, \ldots, Z_n$, respectively, in downlink Ku band Z.
Figure 3B:
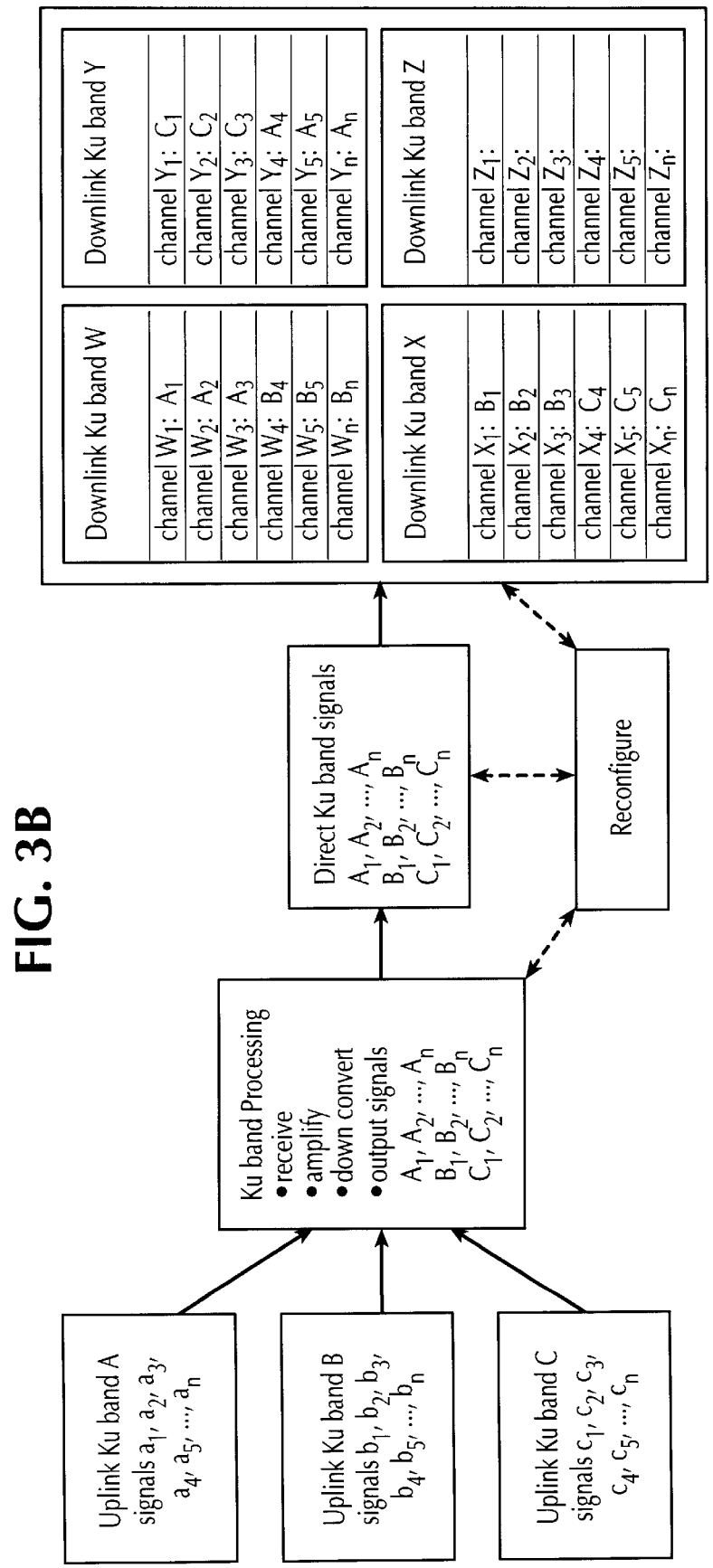
In FIG. 3B, the satellite has been reconfigured so that signals $A_1, A_2, A_3, B_4, B_5, \ldots, B_n$ have been directed to downlink channels $W_1, W_2, W_3, W_4, W_5, \ldots, W_n$, respectively, in downlink Ku band W, signals $B_1, B_2, B_3, C_4, C_5, \ldots, C_n$ have been directed to channels $X_1, X_2, X_3, X_4, X_5, \ldots, X_n$, respectively, in downlink Ku band X, and signals $C_1, C_2, C_3, A_4, A_5, \ldots, A_n$ have been directed to channels $Y_1, Y_2, Y_3, Y_4, Y_5, \ldots, Y_n$, respectively, in downlink Ku band Y.

The replacement satellite of this invention is a practicable (technologically, economically, and otherwise) satellite that can emulate the communications performance of the vast majority of existing and future geostationary communications satellites operating in the Fixed Satellite Service (FSS) bands (that is, C band/Ku band communications satellites), as defined by the International Telecommunications Union ("ITU"). The design of the satellite of this invention is generally not critical and any design that has the required features of this invention and allows the benefits of this invention to be achieved may be used.

The design life of the satellite of this invention should be at least 9 years, desirably at least 10 years, more desirably at least 11 years, most desirably at least 12 years, preferably at least 13 years, more preferably at least 14 years, and most preferably at least 15 years. As discussed below, desirably 14 years will be used as the target design life for designing a satellite of this invention that is capable of making 4 "fast moves" of at least 5 degrees (longitudinal Earth equatorial degrees) per day.

Important aspects of the satellite of this invention include its reconfigurability (e.g., it has a reconfigurable communications payload, flexible transponder design, and flexible telemetry and command design), the ability to pick up signals from a variety of locations on Earth and to amplify and retransmit them to a variety of different locations on Earth while tailoring the one or more downlink footprints, and the ability to quickly move from a storage slot to a slot where it is needed (i.e., a slot that allows it to assume the telecommunications functions of the failed or failing satellite).

Broadly, a communications satellite may be thought of as having seven subsystems: structures, power, thermal control, attitude and orbit control, propulsion, telemetry and command, and communications.

The structures subsystem comprises the framework of the satellite on which and in which are mounted the rest of the components of the satellite. The design of the structures subsystem of the satellite of this invention is not critical and is well within the skill of the art once the features of this invention disclosed herein are understood. Broadly speaking, the structures subsystem of the satellite of this invention will be substantially the same as that of a conventional C band/Ku band communications satellite. Large buses are preferred. Thus, for example, buses such as the Lockheed Martin A2100, Loral FS1300, or the Hughes HS601HP or HS702 may be used. The Loral FS1300 may be preferred for certain embodiments.

The power subsystem comprises the solar panels, which generate electricity and are located on the outside of the satellite, batteries for storing electricity (e.g., electricity generated by the solar panels that is not used at the time of generation), and the distribution network for delivering electricity to the various components of the satellite requiring electrical power. When the solar panels can not provide all of the electricity required, electricity is withdrawn from the batteries. The design of the power subsystem of the satellite of this invention is not critical and is well within the skill of the art once the features of this invention disclosed herein are understood.

Broadly speaking, the power subsystem of the satellite of this invention will be rated at least 8 kilowatts and desirably at least 10 kilowatts. The power subsystem should be capable of providing sufficient power at the end of the design life of the satellite to operate at least 24 channels (transponders) on C band and at least 24 channels (transponders) on Ku band. Preferably, the power subsystem will provide sufficient power to operate at least 30 (desirably at least 32 and preferably at least 36) C band channels and at least 30 (desirably at least 32 and preferably at least 36) Ku band channels at the beginning of the life of the satellite. In the satellite of this invention, the C band channels desirably have a downlink power of about 35–40 watts per channel and the Ku band channels desirably have a downlink power of about 100–150 watts per channel.

The thermal control subsystem helps maintain the operating parts of the satellite within the desired temperature operating range so that the satellite can function properly. Accordingly, some of the heat generated as a byproduct of satellite operations (e.g., by the communications subsystem) will be directed out of the satellite. The design of the thermal control subsystem is not critical and is well within the skill of the art once the features of this invention disclosed herein are understood. The satellite of this invention may use a circulating heat transfer medium (roughly akin to heat pump) to move heat from areas of higher temperature to areas of lower temperature. The satellite may also use heat-radiating surfaces. Broadly speaking, the thermal control subsystem of the satellite of this invention will be similar to the thermal control subsystem of a conventional satellite, the main difference being as follows.

In a conventional C band/Ku band communications satellite, the communications subsystem operates throughout essentially the entire life of the satellite, thereby constantly producing a significant amount of byproduct heat, and the thermal control system is designed accordingly; however, in the satellite of this invention, the communications subsystem typically will operate (and thereby produce byproduct heat) only when the satellite is being used to spare or back-up a failed or failing satellite. Thus, heaters are provided in the satellite of this invention and operated when the communications subsystem is not being used so as to produce approximately the same amount of heat that the communications subsystem produces when it is operational. That results in keeping the thermal load on the thermal control subsystem approximately constant, thereby simplifying its design.

The attitude and orbit control subsystem helps point the satellite towards the Earth so that the satellite is oriented properly with respect to the Earth. The design of the attitude and orbit control system is not critical and is well within the skill of the art once the features of this invention disclosed herein are understood. Broadly speaking, the attitude and orbit control subsystem of the satellite of this invention will be essentially the same as the attitude and orbit control subsystem of any conventional FSS satellite that has the same size, weight, weight distribution, etc.

The propulsion subsystem of the satellite includes thrusters and a fuel supply. Generally speaking, various forces (for example, from the gravitational effects of the sun and moon, atmospheric drag, the elliptical shape of the earth, and solar radiation) cause a satellite to move from its desired location. Therefore, the satellite's thrusters (engines or motors) are fired (typically at regular intervals) for station-keeping to return the satellite to the desired location, in other words, to control the inclination, eccentricity, and drift of the satellite. By "inclination" is meant the inclination of the plane of the satellite's actual orbit (in degrees of latitude) relative to the plane of the Earth's equator (i.e., the north/south position). "Eccentricity" is the measure of the non-circularity of the satellite orbit, in other words, an indication of the variation in distance between the satellite and the Earth as they move. By "drift" is meant the position of the satellite in an east/west direction, for example, relative to a location on the Earth.

The design of the propulsion subsystem of the satellite of this invention is not critical and is well within the skill of the art once the features of this invention disclosed herein are understood. The geostationary satellites for which the satellite of the present invention can be a replacement are typically three-axis stabilized satellites. Such satellites usually use liquid chemical propulsion systems for station-keeping, for example, with one set of thrusters being used to control inclination and a second set being used to control drift and eccentricity.

Broadly speaking, a conventional satellite does not need to make any "fast moves" because sufficient time usually can be allowed for the satellite to move in an east/west direction or for north/south station-keeping (for example, usually anywhere from 30 to 60 days can be allowed for east/west moves). However, a major difference between the satellite of this invention and a conventional satellite is that the satellite of this invention must be capable of making fast moves. Because the satellite of this invention must be moved (usually from its storage orbital location) to the equatorial slot required for it to spare or replace a failed or failing satellite, it must be moved to that slot as quickly as possible to minimize down time (i.e., the time when the desired communications capability is not being provided).

The satellite of this invention will typically be allowed to move north and south of the equatorial plane while it is in storage (i.e., is in its storage orbit around the Earth). As is known to those skilled in the art, if a satellite is placed in a geostationary equatorial orbit and there is no station-keeping, the satellite will slowly move either north or south of the equatorial plane, reach a maximum of roughly 8 degrees inclination either above or below the equatorial plane, and then move in the opposite direction until it again reaches a maximum inclination of roughly 8 degrees in the other direction. In other words, if left in storage for a long time without any station-keeping, the satellite of this invention will oscillate slowly over a period of years between an inclination of roughly +8 degrees and −8 degrees.

Under applicable regulations, e.g., Federal Communications Commission ("FCC") regulations, C band/Ku band geostationary satellites must be about 2 longitudinal (east/west) degrees apart. The circumference of the equatorial planar ring around the Earth in which those geostationary satellites are located (at an altitude of about 22,300 miles) is roughly 160,000 miles. Therefore, the two longitudinal degrees of separation is equivalent to roughly 800 miles. Because it will not be cost effective to provide a replacement satellite of this invention near each orbiting C band/Ku band communications satellite that it can spare, it will often be necessary to move the replacement satellite of this invention many thousands of miles to reach the appropriate slot to spare the failed or failing satellite. Hence, the need for the satellite of this invention to be able to make fast moves.

By a "fast move" is meant a move of at least about 2.5 degrees (longitudinal Earth equatorial degrees) per day, desirably at least 3, more desirably at least 4, most desirably at least 5, preferably at least 6, more preferably at least 7, most preferably at least 8 degrees per day, and sometimes even at least 10 degrees a day.

The satellite of this invention will generally be designed so that during its design life it is capable of making at least 2 fast moves, desirably of at least 3 degrees (longitudinal Earth equatorial degrees) per day, usually at least 3 fast moves of at least 3 degrees per day, desirably at least 3 fast moves of at least 4 degrees per day, more desirably at least 3 fast moves of at least 5 degrees per day, most desirably at least 3 fast moves of at least 6 degrees per day, preferably at least 3 fast moves of at least 7 degrees per day, more preferably at least 3 fast moves of at least 8 degrees per day, sometimes at least 3 fast moves of at least 10 degrees per day, and most preferably at least 4 fast moves of at least 5 degrees per day. Thus, the replacement satellite of this invention will carry substantially more fuel than the typical conventional communications satellite for which it is a spare because it will need to be able to move substantially more quickly than a conventional satellite.

As noted above, desirably 14 years will be used as the target design life for designing a satellite of this invention that is capable of making 4 fast moves of at least 5 degrees (longitudinal Earth equatorial degrees) per day. If the moves (or relocations) made by a satellite of this invention during its lifetime are equivalent to less than that (in other words, less than the equivalent of 4 fast moves of at least 5 degrees per day), the satellite life will be greater than the 14-year design life (assuming no other factor becomes limiting). Because the amount of fuel carried by a satellite of this invention may become the factor that limits the life of the satellite, various techniques for reducing fuel consumption will be used when appropriate, for example, using a "combined drift and inclination maneuver" (described below) to go from the storage (or parking) slot to the slot suitable for replacing (or sparing) the failed or failing satellite and using a slow drift for returning the satellite from the replacement (or sparing) slot to the storage (or parking) location (slot).

Any propulsion subsystem capable of making the required number of fast moves can be used, for example, fluid (e.g., liquid) or solid or plasma systems, e.g., an oxidizer-based system (e.g., one using a hydrazine such as monomethyl hydrazine). Propulsion means that are not powerful enough or otherwise suitable for making the required number of fast moves, e.g., Xenon ion propulsion systems ("XIPS"), may still be used for north/south station-keeping.

Desirably the replacement satellite of this invention can make a combined drift and inclination maneuver while it is moved from its storage location to the slot suitable for backing-up or sparing the failing or failed satellite (the "suitable slot"), thereby reducing the amount of fuel required that would otherwise be required for the move. By "combined drift and inclination maneuver" is meant a maneuver in which the satellite is oriented and its thrusters are fired so that east/west (drift) and north/south (inclination) movement occur simultaneously at some point during the movement from the storage location to the suitable slot. (If the satellite is being used in a first suitable slot to spare a first failed or failing satellite and then is moved to a second suitable slot to spare a second failed or failing satellite, the first suitable slot would be considered to be the storage location from which the replacement satellite was being moved to the second suitable slot.)

The telemetry and command subsystem comprises two sub-subsystems, the telemetry sub-subsystem and the command sub-subsystem. The telemetry sub-subsystem monitors the health of the satellite and transmits the information externally (for example, to a ground control station), and the command sub-subsystem receives commands from outside the satellite (for example, from a ground control station). The design of the telemetry and command subsystem of the satellite of this invention is not critical and is well within the skill of the art once the features of this invention disclosed herein are understood. Broadly speaking, that subsystem of the satellite of this invention will be substantially the same as that of a conventional C band/Ku band communications satellite, with the following exception.

The typical conventional C band/Ku band communications satellite being spared or replaced by the satellite of this invention is designed to use only one or two frequencies for transmission by the telemetry sub-subsystem and only one or two frequencies for reception by the command sub-subsystem. It is a feature of this invention that the satellite of this invention is designed so that at least two different frequencies (desirably at least three, preferably at least four, and most preferably at least five different frequencies) are available for use and can be used by the telemetry sub-subsystem for transmission and that at least two different frequencies (desirably at least three, preferably at least four, and most preferably at least five different frequencies) are available for use and can be used by the command sub-subsystem for reception. In the satellite of this invention, generally four different frequencies will be available for use by the telemetry sub-subsystem and four different frequencies will be available for use by the command sub-subsystem. Any means known to those skilled in the art can be used to change the frequency in each sub-subsystem, for example, frequency synthesizers or fixed oscillators.

Having so many different frequencies available for each sub-subsystem is important because it allows the frequencies used in a given replacement slot in any ITU region to be selected from the ones that are available in the satellite of this invention so as to avoid interference with, for example, functioning satellites that are near the replacement slot. Desirably the polarization of one or more the telemetry and command antennas can also be switched (e.g., from linear to circular or circular to linear, and/or from vertical to horizontal or from horizontal to vertical, and/or from clockwise to counterclockwise or from counterclockwise to clockwise). That further enhances the ability of the satellite of this invention to avoid interference with, for example, neighboring satellites. Also desirably, one or more of the telemetry and command antennas can be adjusted to improve the quality of the transmission and/or reception. Thus, for example, the beam of the telemetry antenna may be positioned so that the beam reaches different locations on Earth, e.g., by moving the antenna itself and/or by adjusting its transmission beam using means such as a phased array. Similarly, the receiving antenna of the command sub-subsystem may be positioned to point it as different locations on Earth.

Preferably omni (omnidirectional) antennas are the primary antennas used for the telemetry and command subsystem, for the following reason. Typically a conventional C band/Ku band communications satellite will, once it is in orbit and operational, receive and transmit the telemetry and command signals within the C band or Ku band themselves, and those bands typically use high gain antennas; however, because the satellite of this invention can back-up so many satellites of different designs and those satellites may be at so many different locations throughout the geostationary equatorial plane, the high gain antennas used in the replacement satellite of this invention may be out of view of the ground telemetry and command station(s) customarily used for the replacement satellite. Hence, on the replacement satellite of this invention, omni antennas and not the high gain antennas are preferred for the telemetry and command subsystem.

The communications subsystem receives signals from Earth according to the uplink frequency plan, amplifies them, and retransmits them according to the downlink frequency plan. Design of the communications subsystem of the satellite of this invention is not critical and is well within the skill of the art once the features of this invention disclosed herein are understood.

The communications subsystem of the satellite of this invention is designed to handle C band and Ku band signals. The C band has uplink frequencies in the 6 GHz range and downlink frequencies in the 4 GHz range. The Ku band has uplink frequencies in the 14 GHz frequency range and downlink frequencies in the 12 GHz range.

Broadly speaking, the communications subsystem includes (a) uplink antennas, which receive the uplink communications signals over one or more preselected bands, each band having more than one channel, (b) one or more filters that allow the signals in the preselected bands to pass while blocking any noise or signals at frequencies outside the preselected bands, (c) one or more amplifiers to increase the strength of the desired signals (e.g., to increase the strength of the signals after they leave the one or more filters), (d) a down converter for reducing the uplink frequencies to the downlink frequencies, (e) means for directing the uplink signals (which are received by one or more C band antennas and one or more Ku band antennas) to the appropriate one or more downlink C band antennas and one or more Ku band antennas, and (f) one or more C band antennas and one or more Ku band antennas. The means for directing the signals to the appropriate antennas can include the down converter (which itself may include switches, fixed oscillators, frequency synthesizers, etc., so that the various signals can be down converted to the desired frequencies and those frequencies can be changed), switches, input multiplexers (IMUXs), output multiplexers (output MUXs), etc.

The original C band uplink range allocated by the ITU was 5.925 GHz to 6.425 GHz (a bandwidth of 500 MHz) and the corresponding downlink range was 3.7 GHz to 4.2 GHz (also a bandwidth of 500 MHz). The ITU later made a second band available, namely, 6.425 to 6.725 GHz for the uplink (a bandwidth of 300 MHz) and 3.4 to 3.7 GHz for the corresponding downlink (also a bandwidth of 300 MHz). More recently a third band for C band uplink signals has been made available, namely, 5.85 GHz to 5.925 GHz (a bandwidth of 75 MHz) but there was no additional band allocated for the downlink. To date, there has been little or no use of this third 75 MHz uplink C band. Thus, C band uplink signals may be in any of the three allocated uplink bands, which happen to be contiguous and occupy 5.85 GHz through 6.725 GHz (a total bandwidth of 875 MHz), and C band downlink signals may be in either of the two allocated downlink bands, which happen to be contiguous and occupy 3.4 GHz through 4.2 GHz (a total bandwidth of 800 MHz).

Principally because of ITU regulations governing which frequencies can be used by C band/Ku band communications satellites in each of the three different ITU regions of the Earth, a satellite handling C band communications will typically operate in only 500 MHz (of the 875 MHz) on the uplink and in only 500 MHz (of the 800 MHz) on the downlink. Thus, a universal replacement satellite must be able to handle at least the 800 MHz of the two earliest uplink C bands from 5.925 GHz through 6.725 GHz (and desirably the entire uplink range of 875 MHz, with the addition of the 75 MHz between 5.85 and 5.925 GHz) and must also be able to handle the entire 800 MHz of the two downlink C bands.

Broadly speaking, within a 500 MHz C band, there will be 24 channels, 12 with one polarization (either vertical or horizontal if linear polarization is used, or either clockwise or counterclockwise if circular polarization is used). Assuming for example that linear polarization is used, each of the 12 vertically polarized channels will be nominally 36 MHz wide, with guard bands between the channels and a guard or buffer band at the top of the 500 MHz range and a guard or buffer band at the bottom of the 500 MHz range. That accounts for the difference between the approximately 41.7 MHz total per channel one calculates by dividing 500 MHz by 12 and the nominal 36 MHz per channel that is usable. The same is true for the 12 horizontally polarized channels. As will be understood by one skilled in the art, the two sets of 12 channels, each channel being nominally 36 MHz wide, can co-exist in the same 500 MHz because the two sets have different polarizations. The same analysis applies for the 24 channels in a band of 500 MHz if circular polarization is used.

For a conventional satellite, the 24 uplink channels may all be transmitted by one or more antennas at substantially the same location on Earth or the channels may be fed by one or more antennas at each of several different locations. Therefore, a conventional satellite designed for a predetermined slot will be designed to capture the 24 channels from all of the transmitting antennas that will be feeding it, and that may require 2 or more uplink antennas. Because the conventional satellite will be in a predetermined slot, the geometry is known prior to design (i.e., the spatial relationship between the one or more transmitting antennas on Earth and the one or more receiving antennas on the satellite is known) and, accordingly, the position and orientation of each satellite uplink antenna on and to the body of the satellite can be predetermined and fixed.

On the other hand, to allow the replacement satellite of this invention to emulate a substantial percentage of the FSS satellites, some (and desirably all) of its uplink antennas must be independently steerable so that they can adequately capture all of the signals being sent by the transmitting antennas on Earth that were feeding the failed or failing satellite being replaced by the satellite of this invention. The replacement satellite will use at least two uplink C band antennas, possibly at least three, and sometimes at least four. The polarity of at least one (and desirably all) of the C band uplink antennas can be changed to accommodate the pre-established uplink frequency plan of the failed or failing satellite being replaced.

Similar considerations apply to the downlink C bands and the downlink antennas. Thus, in a conventional FSS satellite the C band downlink will be 500 MHz wide, with 24 channels (each nominally 36 MHz wide) polarized either in two groups of vertical and horizontal signals or in two groups of clockwise and counterclockwise signals, and the downlink signals will be aimed at one or more receiving antennas in one or more locations on Earth. Again, because the geometry is known prior to designing a conventional FSS satellite (i.e., that distance and direction between each downlink antenna on the satellite and the desired receiving area or antennas on Earth), the downlink antennas will be fixed in location and orientation on that satellite.

The replacement satellite of this invention will use at least two downlink C band antennas, desirably at least three, preferably at least four, and in some cases at least five. The polarity of at least one (and desirably two, three, four, or more) of the C band downlink antennas can be changed to accommodate the pre-established downlink frequency plan of the failed or failing satellite being replaced. At least some and desirably most of the antennas have sufficient gain with broad coverage. The minimum EIRP (effective isotropic radiated power) for the C band downlink antennas is desirably 36 dbw (decibels with a reference point of a watt).

At least one (and desirably two, three, four, or more) of the C band downlink antennas must have beams that are independently directable so that they can send strong enough signals to all of the antennas on Earth that were receiving signals from the failed or failing satellite being replaced by the satellite of this invention. Directing the beam emanating from an antenna may be accomplished in any appropriate manner, e.g., by steering the antenna itself, by using a multiple beam antenna, by using a phased array antenna, or by using any other type of reconfigurable antenna (see, e.g., U.S. Pat. No. 4,965,587).

In contrast to the C band uplink signal, which may come from only a few antennas (and perhaps as few as just one transmitting antenna on Earth), one or more of the downlink signals may have to be sent to many antennas over a wide area, for example, to the receiving antennas of all of the television cable companies throughout the entire continental United States that carry a particular signal for redistribution to their own customers (e.g., the signal from a nationally distributed movie or sports content provider, which signal is uplinked to a satellite and downlinked from the satellite to cable companies throughout the United States for redistribution by each cable company to its own customers). Alternatively, a particular downlink beam may have to be sent to a rather circumscribed geographic region. Thus, it is desirable that the footprint of at least one (and desirably of two, three, four, or more) of the C band downlink antennas be able to be changed. The footprint of an antenna's downlink beam may be changed using any appropriate means, for example, by steering (moving or redirecting) the antenna and/or by changing the shape of the antenna's beam (e.g., by using a phased array antenna, a reconfigurable antenna, or by any other suitable method).

The entire uplink Ku band occupies 13.75 GHz through 14.5 GHz and may be thought of as having 3 uplink bands, which is each 250 MHz wide and which are contiguous, in other words, one band from 13.75 GHz to 14.00 GHz, a second band from 14.00 GHz to 14.25 GHz, and a third band from 14.25 GHz to 14.50 GHz. In contrast, there are several downlink Ku bands, but only some are contiguous. The first nominal downlink band is at 10.95 GHz to 11.20 GHz (250 MHz bandwidth), the second nominal band runs from 11.45 GHz to 11.70 GHz (250 MHz bandwidth), the third nominal band runs from 11.70 GHz to 12.20 GHz (500 MHz bandwidth), and the fourth nominal band runs from 12.20 GHz to 12.75 GHz (550 MHz bandwidth). The fourth nominal band may itself be considered to comprise two nominal bands, one running from 12.2 to 12.5 GHz, which is a 300 MHz band, and the other running from 12.5 to 12.75 GHz, a 250 MHz band, for a total of 5 bands.

As noted above, the satellite of this invention is practicable, technologically, economically, and otherwise. Practicability has been achieved by carefully determining the features necessary for practicability as opposed to including by rote all features needed for perfect emulation of all existing and future FSS satellites. Thus, although the 50 MHz of bandwidth from 12.20 to 12.25 GHz is part of the spectrum allocated by the ITU for downlink Ku band signals, in some preferred embodiments of the present invention, that 50 MHz will not be used. Thus, in those embodiments, the fourth band will run from 12.25 GHz to 12.75 GHz (a 500 MHz band). Not using the 50 MHz of bandwidth between 12.20 and 12.25 GHz in some preferred embodiments simplifies the design of the satellite of this invention because in those embodiments, all of the uplink and downlink Ku band spectrum used can be conveniently divided into blocks of 250 MHz (3 uplink 250 MHz bands and 6 downlink 250 MHz bands). That is not the case in those embodiments also utilizing the 50 MHz from 12.20 to 12.25 GHz (because the fourth band used, from 12.20 to 12.75 GHz, would be 550 MHz wide).

Accordingly, viewed one way, in those preferred embodiments not using the 50 MHz from 12.20 to 12.25 GHz, nominally there are 4 downlink Ku bands, two having bandwidths each of 250 MHz and two having bandwidths each of 500 MHz (i.e., 10.95–11.20, 11.45–11.70, 11.7–12.2, and 12.25–12.75 GHz). Viewed another way, in those preferred embodiments, there are 6 downlink Ku bands, each having a bandwidth of 250 MHz. Regardless of how many Ku bands one considers there to be, there is a total of 1550 MHz (1.55 GHz) of non-contiguous bandwidth allocated by the ITU for Ku band downlink signals within the range of 10.95 GHz to 12.75 GHz; however, in some of the preferred embodiments of the present invention, only 1500 MHz (1.5 GHz) will be used.

It will be understood that in the claims, a band from 12.25 to 12.75 GHz, which may be thought of as comprising 2 bands each of 250 MHz, is within a band of 12.20 to 12.75 GHz. Thus, in the claims, "outputting any of those amplified, reduced-frequency Ku band signals as Ku band downlink signals in the channels of any of six 250 MHz bands within the 10.95–11.20 GHz, 11.45–11.70 GHz, 11.70–12.20 GHz, and 12.25–12.75 GHz downlink Ku bands, each downlink Ku band having a plurality of downlink Ku band channels" is not avoided merely by using in addition the 50 MHz between 12.20 and 12.25 GHz.

Principally because of ITU regulations governing which frequencies can be used by C band/Ku band communications satellites in each of the three different ITU regions of the Earth, a satellite handling Ku band communications will typically operate in only 500 MHz (of the 750 MHz allocated) on the uplink and in only 500 MHz (of the 1550

MHz allocated) on the downlink. Thus, a universal replacement satellite must be able to handle all 750 MHz of the uplink Ku bands (which the present invention does) and must also be able to handle most, if not all of the 1550 MHz of allocated downlink Ku band (as noted, in some preferred embodiments of the present invention, only 1500 MHz of the 1550 MHz available will be used).

Broadly speaking, in a satellite of this invention, there will typically be a total for both polarities (i.e., vertical and horizontal, or clockwise and counterclockwise) of 72 Ku band downlink channels available, each nominally 36 MHz wide (1500 MHz divided by 36 for each polarity is approximately 41.7 MHz, and the difference between 41.7 and 36 arises from the presence of guard bands, etc.). Broadly speaking, not more than 750 MHz of downlink Ku bandwidth is used in any one conventional FSS satellite. Accordingly, the satellite of this invention will preferably be designed to power up only 36 channels (total for both polarities) at start of life (the design point for end of life is 24 channels), although at which frequencies those 36 are powered up will depend upon which conventional FSS satellite is being replaced by the satellite of this invention.

One important feature of the satellite of this invention is that it can receive and direct signals in any one of the three uplink Ku bands to any one of the four nominal downlink Ku bands (or to any one of the five downlink Ku bands if there are considered to be five such bands). Preferably the satellite of this invention can receive and direct signals in any one of the three uplink Ku bands to any one of the six 250 MHz-wide downlink Ku bands. This helps the satellite of this invention emulate the communications performance of the failed or failing C band/Ku band communications satellite that it is replacing.

As with C band, the Ku band channels of a satellite of this invention are each nominally 36 MHz wide, and polarization (linear or circular) desirably is used. Thus, the 500 MHz uplink bandwidth has a total of 24 channels, 12 channels polarized vertically and 12 channels polarized horizontally (or 12 channels polarized clockwise and 12 channels polarized counterclockwise). Considering the 12 vertically polarized channels first, the presence of guard bands between the channels, a guard or buffer band at the top of the 500 MHz range, and a guard or buffer band at the bottom of the 500 MHz range accounts for the difference between the approximately 41.7 MHz total per channel one calculates by dividing 500 MHz by 12 and the nominal 36 MHz per channel that desirably is used in the satellite of this invention. The same is true for the 12 horizontally polarized channels. As will be understood by one skilled in the art, the two sets of 12 channels, each channel being nominally 36 MHz wide, can co-exist in the same 500 MHz because the two sets have different polarizations. The same analysis applies for the 24 channels in a band of 500 MHz if circular polarization is used.

There is no one standard channel bandwidth for the Ku band, and bandwidths of 27, 36, 43, 54, 72, and 108 MHz have been or are being used. Thus, another preferred feature of this invention is that a standard bandwidth is used for the majority of Ku bands (and most preferably for all Ku bands), and most preferably that bandwidth is nominally 36 MHz. For the two non-contiguous downlink Ku bands (i.e., from 10.95 to 11.2 GHz and from 11.45 to 11.70 GHz), the channels preferably are 35 MHz wide, but that width is considered to be within the terms "nominally 36 MHz wide" and "a nominal bandwidth of 36 MHz." Use of a standard bandwidth for all uplink and downlink Ku bands (whether nominally 36 MHz or some other value) allows, for example, filters and multiplexers necessary for handling the other bandwidths to be omitted, thereby simplifying the design and helping to make the satellite of this invention practicable.

As with C band, for a conventional satellite, the 24 uplink channels may all be transmitted by one or more antennas at substantially the same location on Earth or the channels may be fed by one or more antennas at each of several different locations. Therefore, a conventional satellite designed for a predetermined slot will be designed to capture the 24 Ku band channels from all of the transmitting antennas that will be feeding it (assuming that the preferred nominal bandwidth of 36 MHz is used), and that may require 2 or more uplink antennas. Because the conventional satellite will be in a predetermined slot, the geometry is known prior to design (i.e., the spatial relationship between the one or more transmitting antennas on Earth and the one or more receiving Ku band antennas on the satellite is known) and, accordingly, the position and orientation of each satellite uplink antenna on and to the body of the satellite can be predetermined and fixed.

On the other hand, to allow the replacement satellite of this invention to emulate a substantial percentage of the FSS satellites, some (and desirably all) of its Ku band uplink antennas must be independently steerable so that they can adequately capture all of the signals being sent by the transmitting antennas on Earth that were feeding the failed or failing satellite being replaced by the replacement satellite of this invention. The replacement satellite will use at least two uplink Ku band antennas, possibly at least three, and sometimes at least four. The polarity of at least one (and desirably all) of the Ku band uplink antennas can be changed to accommodate the pre-established uplink frequency plan of the failed or failing satellite being replaced.

In a conventional FSS satellite, the Ku band downlink will be 250, 300, or 500 MHz wide, with channels (each desirably nominally 36 MHz wide) polarized either in two groups of vertical and horizontal signals or in two groups of clockwise and counterclockwise signals, and the downlink signals will be aimed at one or more receiving antennas in one or more locations on Earth. Again, because the geometry is known prior to designing a conventional FSS satellite (i.e., that distance and direction between each downlink Ku band antenna on the satellite and the desired receiving area or antennas on Earth), the downlink antennas will be fixed in location and orientation on that satellite.

The replacement satellite of this invention will use at least two downlink Ku band antennas, desirably at least three, preferably at least four, and in some cases at least five. The polarity of at least one (and desirably two, three, four, or more) of the Ku band downlink antennas can be changed to accommodate the pre-established downlink frequency plan of the failed or failing satellite being replaced. At least some and desirably most of the antennas have sufficient gain with broad coverage. The minimum EIRP (effective isotropic radiated power) for the Ku band downlink antennas is desirably 48 dbw to 50 dbw (spot) at the edge of coverage. The Ku band downlink antennas should have a variety of beam shapes and gain levels, and their design is well within the skill of the art.

At least one (and desirably two, three, four, or more) of the Ku band downlink antennas must have beams that are independently directable so that they can send strong enough signals to all of the antennas on Earth that were receiving signals from the failed or failing satellite being replaced by the satellite of this invention. As for the C band downlink antennas, directing the beam emanating from a Ku band antenna may be accomplished in any appropriate manner, e.g., by steering the antenna itself, by using a multiple beam antenna, by using a phased array antenna, or by using any other type of reconfigurable antenna (see, e.g., U.S. Pat. No. 4,965,587).

In contrast to the uplink Ku band signals, which may come from only a few antennas (and perhaps as few as just one transmitting antenna on Earth), one or more of the downlink signals may have to be sent to many antennas over a wide area, for example, to the receiving antennas of all of the television cable companies throughout the entire continental United States who carry a particular signal for redistribution to their own customers. Alternatively, a particular downlink beam may have to be sent to a rather circumscribed geographic region. Thus, it is desirable that the footprint of at least one (and desirably of two, three, four, or more) of the Ku band downlink antennas be able to be changed. The footprint of an antenna's downlink beam may be changed using any appropriate means, for example, by steering (moving or redirecting) the antenna and/or by changing the shape of the antenna's beam (e.g., by using a phased array antenna, a reconfigurable antenna, or by any other suitable method).

For example, for one possible embodiment of the satellite of this invention, for the Ku band, one antenna with broad coverage would be used to provide coverage of at least 48 dbw for the continental United States, a section of lower Canada, and the upper portion of Mexico and a spot antenna would be used to provide coverage of at least 42 dbw for Hawaii. With respect to another use of that embodiment of this invention, the satellite being replaced has five Ku band coverage areas, one centered on India at 42 dbw, one centered on China at 42 dbw, one centered on South Africa at 50 dbw, one centered on the Middle East at 42 dbw, and one covering Turkey, northern Africa, and southern Europe at 42 dbw, but the replacement satellite uses four coverage areas, one covering South Africa and countries north of it at 50 dbw, one covering most of India and China at 48 dbw, one covering northern Australia and the area between it and China at 48 dbw, and one covering the Middle East, Turkey, northern Africa, and southern Europe at 48 dbw . The coverage patterns and power levels of the replacement satellite of this invention are not identical to those of the satellite it would replace but are close enough to be considered to satisfactorily mimic or emulate the communications capabilities of that satellite.

With respect to both C band and Ku band, another desirable feature of this invention is that some and preferably all of the uplink and downlink antennas on the replacement satellite are steerable (or movable), both north/south and east/west, by at least 2 degrees from the normal, desirably at least 3 degrees, more desirably at least 4 degrees, most desirably at least 5 degrees, preferably at least 6 degrees, more preferably at least 7 degrees, and in some cases at least 8 degrees from the normal. In a conventional FSS satellite, the antennas are seldom movable by more than 1 degree north/south or east/west from the normal. The steerability of the antennas of the satellite of this invention helps make that satellite practicable while still allowing it to maintain sufficient flexibility to meet the frequency plans of just about any FSS satellite. The steerability of the downlink antennas may be in addition to means that may be used to direct the beams emanating from the downlink antennas (e.g., phased array or beam forming technology).

As is known, with a conventional FSS satellite, a given signal received by the satellite in a particular C band or Ku band channel may have to be retransmitted along with another uplinked C band or Ku band signal to a particular geographic area. Thus, for example, a first Ku band uplink signal may have to be directed to a Ku band downlink antenna on the satellite serving that geographic area and a second Ku band uplink signal may have to be directed to that same downlink antenna. It may also be the case that the two uplink Ku band signals are on channels having uplink frequencies such that they will require different "amounts" of down conversion to be on the same antenna. It may also be the case that various uplinked signals in a band, perhaps even signals transmitted by the same ground antenna, must be directed to two or more different downlink antennas. Thus, the conventional FSS satellite will be designed with knowledge of the uplink frequency plan (e.g., the location on Earth of each antenna sending the uplink signals, what frequency each signal has) and the downlink frequency plan (e.g., what frequency each signal should have and the location to which the signals have to be sent). That makes it relatively easy to design the down converter, input multiplexers, output multiplexers, etc.

As will be appreciated by one skilled in the art, the numerous existing and planned FSS satellites have many different uplink and downlink frequency plans and many different plans for redirecting the various uplinked signals to the appropriate downlink antennas. It is an important feature of this invention that the replacement satellite can accommodate the wide variety of uplink and downlink frequency plans found in the majority (and preferably the vast majority) of existing and planned FSS satellites.

A perfect clone replacement satellite would contain all the switches, down conversion means, input multiplexers, output multiplexers, etc. needed to allow perfect emulation of all of the uplink and downlink frequency plans in all FSS satellites. For perfect emulation, each uplink signal in the clone would have to be able to be sent to any of the downlink channels without in any way affecting to where any of the other uplink signals was being sent; however, that would make the design impractical (e.g., overly complex) and costly.

In contrast, the satellite of this invention is practicable, technologically, economically, and otherwise. As previously noted, practicability has been achieved by carefully determining the features necessary for practicability as opposed to including by rote all features needed for perfect emulation. Thus, for example, instead of being able to individually and independently switch each uplink signal to any downlink channel in any band, all least some, desirably most, and preferably all of the uplinked signals are switched in bundles. Those bundles contain at least 2 signals each, desirably at least 3, more desirably at least 4, most desirably at least 6, preferably at least 7, more preferably at least 8, and most preferably at least 9. In some preferred embodiments, a bundle will contain 12 signals. Obviously the more signals per bundle, the less the flexibility the processing means (and therefore the satellite) has for emulating FSS satellites. Therefore, in some preferred embodiments, 3 or 6 signals will be bundled. Although not all of the signals in a band need be bundled or need to be in the same size bundles, it is preferred that all signals in a band be bundled and that the bundles have the same size. Thus, for example, for Ku band, for which 36 channels may be used at start of life and for which at least 24 channels may be used at end of life, desirably all signals are bundled and each bundle may contain 3 or 6 signals. As will be understood by one skilled in the art, the fewer the number of signals per bundle, the lesser is the granularity of the processing means.

The down conversion (downward frequency shift) of the frequencies of the uplink signals to the appropriate frequencies for the downlink channels to be used may be made using any means that performs that function and allows the benefits of this invention to be achieved. The design is not critical and is well within the skill of the art once the features of this invention disclosed herein are understood. Thus, means that allow flexibility in down converting the signals are needed. Such means include frequency synthesizers and oscillators (e.g., fixed oscillators) plus switching. Further switching directs the reduced-frequency signals to various input multiplexers where two or more (e.g., preferably 3 or 6) are selected (e.g., by filters) and sent on to amplifiers for boosting their power. The output of the amplifiers is then sent to the output multiplexers where the individual signals are combined for sending to the antennas. As will be understood by one skilled in the art, the particular pathways and equipment and means used for these various tasks is not critical, and any means can be used that performs the necessary functions and allows the benefits of this invention to be achieved. The design of those means is not critical and is well within the skill of the art once the features of this invention disclosed herein are understood.

As will be understood by one skilled in the art, directing a particular uplink signal to a particular downlink antenna will generally involve determining what the downlink frequency to be for that signal and then converting it to that frequency using the down conversion means provided in the replacement satellite, which means may be, e.g., a frequency synthesizer or fixed oscillators plus switches. The change in frequency for that first signal (uplink frequency minus downlink frequency) will be of a certain number of Hz. Directing another uplink signal to the same downlink antenna may involve making a change in frequency of a substantially different number of Hz. With the switching and the input and output multiplexers in the replacement satellite, the two uplink signals can be processed so that they are sent to the same downlink antenna. In other words, as a result of this, those signals will be bundled together.

Another important feature of this invention is that it can be remotely reconfigured, that is, signals can be sent from a ground command station to the satellite not only to have the satellite move from its then-current location (which may be in a storage slot) but also to reconfigure it to remotely adjust the Ku band processing means to direct a bundle of at least two but of fewer than all of the signals in each of the uplink Ku bands to any one of the downlink Ku bands, and/or to remotely adjust the downlink beam from at least one of the Ku band downlink antennas to direct the beam to different locations on Earth, and/or to remotely adjust the downlink beam from at least one of the C band downlink antennas to direct the beam to different locations on Earth, and/or to remotely change the footprint of the downlink beam from at least one of the downlink antennas, and/or to remotely change the polarity of at least one of the downlink antennas. The means to cause such reconfiguration, as well as additional changes that are desired (e.g., moving one or more of the uplink antennas) can be any means that performs that function and allows the benefits of this invention to be achieved. The design is not critical and is well within the skill of the art once the features of this invention disclosed herein are understood.

The satellite of this invention may be launched and positioned in a storage orbit using means and techniques known to those skilled in the art. Thus, for example, launch vehicles such as Sea Launch, Ariane, and Proton may be used. The satellite of this invention when first placed in orbit will typically weigh between 4,000 and 5,000 kilograms and more likely between 4,300 and 4,900 kilograms.

The initial storage orbit is typically in a plane inclined to the equatorial plane. As discussed above, the storage plane of the satellite of this invention will slowly oscillate between inclinations of roughly +8 and roughly –8 degrees to the equator unless the satellite is purposely moved. Thus, even though the replacement satellite may initially be placed in a plane inclined to the equator for storage, by the time the replacement satellite is to be moved from its storage orbit to an operational slot, that storage orbit may be in a plane different from the one in which it was initially placed.

Desirably a constellation of at least two (and preferably at least five) universal replacement satellites of this invention will be used. They generally will be stored in different locations in an east/west direction, although they may not be evenly spaced in an east/west direction. Storing a replacement satellite closer to the conventional satellites for which it is designated to be the replacement usually reduces the amount of communications downtime arising from a failure of the conventional satellite (because the replacement satellite has less distance to travel from the storage slot to the operational slot of the satellite it is replacing).

The satellite of this invention may be launched and placed into an orbital (storage) slot that does not require a separate ITU license. The orbit of the satellite may be allowed to move up and down with respect to the equatorial plane (i.e., become inclined). After a conventional satellite for which the present satellite can act as a back-up fails to an unacceptable degree (which may be anywhere from a partial failure to a complete failure), the appropriate command is sent from outside the replacement satellite (for example, from a ground control station) to the replacement satellite's command sub-subsystem. That results in the satellite moving from its storage slot to the slot in which it will operate to replace the failing or failed satellite. At the appropriate time, one or more external command signal cause reconfiguration of the satellite to the extent necessary, for example, to match the uplink and downlink frequency plans of the satellite being emulated, to correctly position all of the uplink and downlink antennas, to change the downlink footprints, and to change the telemetry and command frequencies (if necessary) so that the replacement satellite will not interfere with the functioning of adjacent operating satellites.

The reconfiguration of the replacement satellite can include adjusting the Ku band processing means so that it can direct a bundle of at least two but of fewer than all of the signals in each of the uplink Ku bands to any one of the downlink Ku bands, adjusting the downlink beam from at least one of the Ku band downlink antennas to direct the beam to the appropriate location on Earth, adjusting the downlink beam from at least one of the C band downlink antennas to direct the beam to different locations on Earth, changing the footprint of the downlink beam from at least one of the downlink antennas, and changing the polarity of at least one of the downlink antennas. The other changes described herein may also be made so that the satellite can emulate insofar as is possible the communications capabilities of the satellite being replaced.

The replacement satellite of this invention will stay in the operational slot to which it has been moved until, for example, the failed satellite is replaced. The replacement satellite of this invention will then be moved back to a storage slot or possibly moved to a new operational slot and reconfigured to spare another failed or failing satellite.

Preferably within C band and within Ku band all of the transponders (each of which for an uplink channel may be thought of as comprising the amplifier after the initial filter and the down converter) can be switched to any of the downlink antennas within that band and the polarizations of the downlink antennas can be varied. Both of those allow the replacement satellite to transmit downlink signals in accordance with the previously established downlink frequency plan for the failed or failing satellite being replaced. The fact that preferably all the signals are bundled (in bundles of at least 2 signals) helps make the satellite of this invention practicable while still maintaining sufficient flexibility to meet the frequency plans of just about any FSS satellite. The use of amplifiers of sufficient power and the use of reconfigurable downlink antennas further makes the replacement satellite practicable. As explained above, in some preferred embodiments, the 50 MHz between 12.20 and 12.25 GHz in the Ku band is not used. That simplifies the design of the satellite because both the uplink and the downlink Ku bands can be dealt with in standard size bands of 250 MHz, there further making the satellite of this invention practicable. The use of a standardized bandwidth for the Ku band simplifies the design and also helps make the satellite of this invention practicable.

In some preferred embodiments, the replacement satellite has a telemetry sub-subsystem that can transmit on four different frequencies and a command sub-subsystem that can receive on four different frequencies, each with variable frequencies and switchable polarizations. That allows the replacement satellite to be stored and to be used in a wide variety of slots without frequency interference in any of the three ITU regions, further making the satellite of this invention practicable.

As will be appreciated by those skilled in the art, the satellite of this invention is technologically, economically, and otherwise practicable while still providing effective back-up coverage (that is, acting as a virtually transparent replacement) for the majority (generally at least 75%, desirably at least 85%, preferably at least 90%, and most preferably at least 95%) of existing and planned FSS satellites. As used in the claims, "emulate the communications performance of a substantial percentage of existing geostationary C band and Ku band communications satellites" refers to this capability. As will be appreciated by one skilled in the art, emulating the communications performance does not mean that the replacement satellite of this invention can always be reconfigured to perfectly mimic the communications performance of a failed or failing satellite. Thus, as discussed above, there may be a difference in coverage patterns and some reassignment of signals to different channels may be necessary.

As will also be appreciated by those skilled in the art, that the satellite of this invention is technologically, economically, and otherwise practicable while still providing effective back-up coverage for the majority of existing and planned FSS satellites is made possible by the unique design of the satellite, which features a combination of frequency agility, the preferred use of a standard bandwidth for the Ku band, independently steerable uplink antennas, independently directable downlink beams, independently variable downlink beams whose footprints can be tailored, amplifiers of sufficient power, flexible telemetry and command design, and the ability to make a sufficient number of fast moves over the satellite's design life.

Variations and modifications of what has been explicitly disclosed herein will be apparent to those skilled in the art and the following claims are intended to cover all variations and modifications falling within the true spirit and scope of the invention. For example, the universal replacement satellite of this invention may also contain means for handling BSS (broadcast satellite services) communications.

For all three ITU regions, the BSS uplink frequency band is 17.3 GHz to 18.1 GHz. For ITU Region I, the downlink BSS band is 11.7 to 12.5 GHz, for Region II the downlink BSS band is 12.2 to 12.7 GHz, and for Region III the downlink BSS band is 11.7 to 12.2 GHz. Thus, the downlink BSS bands for Earth are within the range of 11.7 GHz to 12.7 GHz. The ranges for the downlink Ku bands (if considered to be four downlink bands) preferably used herein are 10.95–11.20 GHz, 11.45–11.70 GHz, 11.7–12.2 GHz, and 12.25–12.75 GHz. (As explained above, the 50 MHz between 12.2 and 12.25 MHz is allocated by the ITU for use for Ku band downlink signals but preferably is not used herein.) Thus, the downlink BSS bands are within the scope of the downlink Ku bands (except for the preferred omission of the 50 MHz between 12.2 and 12.25 GHz). Therefore, with not too much additional equipment, the satellite of this invention may also contain means for receiving BSS signals, down converting their signals to the same Ku bands already present for handling Ku band downlink signals, amplifying, and transmitting the down converted, amplified BSS signals back to Earth. Thus, in one embodiment, the universal replacement satellite of this invention will be able to act as a spare to handle BSS signals and FSS signals although at any one time it may be used to act as a replacement for only an FSS or a BSS satellite. The design of the additional means needed to handle BSS signals is well within the skill of the art.

Still other variations and modifications will be apparent to those skilled in the art, and the claims are intended to cover those variations and modifications as well.

I claim:

1. A universal replacement communications satellite designed for orbiting the Earth in a geostationary orbit, which can be controlled by an external control system, which is reconfigurable, and which can emulate the communications performance of a substantial percentage of existing geostationary C band and Ku band communications satellites and therefore for which it can be a replacement, the universal replacement satellite being designed to receive uplink C band and Ku band signals and to output C band and Ku band downlink signals, the universal replacement communications satellite comprising:

(a) Ku band processing means for (i) receiving Ku band uplink signals in the channels of three 250 MHz uplink bands of 13.75–14.00 GHz, 14.00–14.25 GHz, and 14.25–14.50 GHz, each uplink band having a plurality of uplink Ku band channels, (ii) amplifying the signals, (iii) down converting their frequencies, and (iv) outputting any of those amplified, reduced-frequency Ku band signals as Ku band downlink signals in the channels of any of six 250 MHz bands within the 10.95–11.20 GHz, 11.45–11.70 GHz, 11.70–12.20 GHz, and 12.25–12.75 GHz downlink Ku bands, each downlink Ku band having a plurality of downlink Ku band channels;

(b) two or more Ku band downlink antennas, each antenna capable of outputting a downlink beam comprising Ku band downlink signals, each downlink beam being separately directable to different locations on Earth;

(c) means for directing the Ku band downlink signals to any one of the two or more Ku band downlink antennas;

(d) C band processing means for (i) receiving C band uplink signals in the channels of two uplink bands of 5.925 to 6.425 GHz and 6.425 to 6.725 GHz, each uplink band having a plurality of uplink C band channels, (ii) amplifying the signals, (iii) down converting their frequencies, and (iv) outputting those amplified, reduced-frequency C band signals as C band downlink signals in the channels of the 3.70–4.20 GHz and 3.40–3.70 GHz downlink C bands, each downlink C band having a plurality of downlink C band channels;

(e) two or more C band downlink antennas, each antenna capable of outputting a downlink beam comprising downlink C band signals, each downlink beam being separately directable to different locations on Earth;

(f) means for directing the C band downlink signals to any one of the two or more C band downlink antennas;

(g) a propulsion subsystem designed to allow the satellite to make at least three fast moves, each of at least three degrees per day, during the design life of the satellite;

(h) a power subsystem to provide electrical power for satellite operation;

(i) a telemetry and command subsystem to allow the satellite to monitor itself and for communicating with the external control system, the subsystem comprising a telemetry sub-subsystem that can transmit on at least two different frequencies and a command sub-subsystem that can receive on at least two different frequencies;

(j) an attitude and orbit control subsystem for helping to properly orient the satellite with respect to Earth;

(k) a thermal control subsystem for helping to maintain the satellite within the proper temperature range for operation; and (l) means to reconfigure the satellite, said means comprising (i) means to remotely adjust the Ku band processing means to direct a bundle of at least two but of fewer than all of the signals in each of the uplink Ku bands to any one of the downlink Ku bands, (ii) means to remotely adjust the downlink beam from at least one of the Ku band downlink antennas to direct the beam to different locations on Earth, (iii) means to remotely adjust the downlink beam from at least one of the C band downlink antennas to direct the beam to different locations on Earth, (iv) means to remotely change the footprint of the downlink beam from at least one of the downlink antennas, and (v) means to remotely change the polarity of at least one of the downlink antennas.

2. The replacement satellite of claim 1 wherein the C band processing means can output those amplified, reduced-frequency C band signals as C band downlink signals in the channels of either of the 3.70–4.20 GHz and 3.40–3.70 GHz downlink C bands.

3. The replacement satellite of claim 1 wherein the means to reconfigure the satellite includes means to remotely adjust the Ku band processing means to direct some but not all of the signals in one of the Ku uplink bands to any one of the six downlink Ku bands and to direct other signals in that one of the Ku uplink bands to the same or a different one of the six downlink Ku bands.

4. The replacement satellite of claim 3 wherein the means to remotely adjust the Ku band processing means to direct the signals comprises means to remotely adjust the Ku band processing means to change the frequencies to which the signals are down converted.

5. The replacement satellite of claim 1 further comprising at least two uplink C band antennas and at least two uplink Ku band antennas, all of the uplink antennas being independently steerable to different locations on Earth.

6. The replacement satellite of claim 5 in which the uplink antennas also function as the downlink antennas.

7. The replacement satellite of claim 1 wherein it is designed so that at the end of its design life, the signals of at least twenty-four uplink Ku band channels can be processed by the Ku band processing means and the signals of at least twenty-four uplink C band channels can be processed by the C band processing means.

8. The replacement satellite of claim 1 wherein the means to remotely change the polarity of at least one of the downlink antennas comprises means to remotely change the polarity from linear to circular or from circular to linear.

9. The replacement satellite of claim 1 wherein the means to remotely change the polarity of at least one of the downlink antennas comprises means to remotely change the polarity from horizontal to vertical or from vertical to horizontal.

10. The replacement satellite of claim 1 wherein the means to remotely change the polarity of at least one of the downlink antennas comprises means to remotely change the polarity from clockwise to counterclockwise or from counterclockwise to clockwise.

11. The replacement satellite of claim 1 wherein some of the Ku band channels have a standard bandwidth.

12. The replacement satellite of claim 1 wherein all of the Ku band channels have a standard bandwidth.

13. The replacement satellite of claim 12 wherein the standard bandwidth is nominally 36 MHz.

14. The replacement satellite of claim 1 further comprising BSS band processing means comprising means for (i) receiving BSS uplink signals at frequencies ranging from 17.3 GHz to 18.1 GHz, (ii) amplifying the BSS signals, (iii) down converting their frequencies, and (iv) outputting those amplified, reduced-frequency BSS band signals as BSS downlink signals in the channels of the bands provided for downlink Ku band signals.

15. A universal replacement communications satellite designed for orbiting the Earth in a geostationary orbit, which can be controlled by an external control system, which is reconfigurable, and which can emulate the communications performance of a substantial percentage of existing geostationary C band and Ku band communications satellites and therefore for which it can be a replacement, the universal replacement satellite being designed to receive uplink C band and Ku band signals and to output C band and Ku band downlink signals, the universal replacement communications satellite comprising:

(a) Ku band processing means for (i) receiving Ku band uplink signals in the channels of three 250 MHz uplink bands of 13.75–14.00 GHz, 14.00–14.25 GHz, and 14.25–14.50 GHz, each uplink band having a plurality of uplink Ku band channels, (ii) amplifying the signals, (iii) down converting their frequencies, and (iv) outputting any of those amplified, reduced-frequency Ku band signals as Ku band downlink signals in the channels of any of six 250 MHz bands within the 10.95–11.20 GHz, 11.45–11.70 GHz, 11.70–12.20 GHz, and 12.25–12.75 GHz downlink Ku bands, each downlink Ku band having a plurality of downlink Ku band channels;

(b) two or more Ku band downlink antennas, each antenna capable of outputting a downlink beam comprising Ku band downlink signals, each downlink beam being separately directable to different locations on Earth;

(c) means for directing the Ku band downlink signals to any one of the two or more Ku band downlink antennas;

(d) C band processing means for (i) receiving C band uplink signals in the channels of two uplink bands of about 5.925 to 6.425 GHz and 6.425 to 6.725 GHz, each uplink band having a plurality of uplink C band channels, (ii) amplifying the signals, (iii) down converting their frequencies, and (iv) outputting those amplified, reduced-frequency C band signals as C band downlink signals in the channels of the 3.70–4.20 GHz and 3.40–3.70 GHz downlink C bands, each downlink C band having a plurality of downlink C band channels;

(e) two or more C band downlink antennas, each antenna capable of outputting a downlink beam comprising downlink C band signals, each downlink beam being separately directable to different locations on Earth;

(f) means for directing the C band downlink signals to any one of the two or more C band downlink antennas;

(g) a propulsion subsystem designed to allow the satellite to make at least three fast moves during the design life of the satellite;

(h) a power subsystem to provide electrical power for satellite operation;

(i) a telemetry and command subsystem to allow the satellite to monitor itself and for communicating with the external control system;

(j) an attitude and orbit control subsystem for helping to properly orient the satellite with respect to Earth;

(k) a thermal control subsystem for helping to maintain the satellite within the proper temperature range for operation; and (l) means to reconfigure the satellite.

16. The replacement satellite of claim 15 wherein the means to reconfigure the satellite includes means to remotely adjust the Ku band processing means to direct all of the signals in each of the uplink Ku bands to any one of the downlink Ku bands.

17. The replacement satellite of claim 16 wherein the means to remotely adjust the Ku band processing means to direct all of the signals in each of the uplink Ku bands to any one of the downlink Ku bands comprises means to remotely adjust the Ku band processing means to change the frequencies to which the signals are down converted.

18. The replacement satellite of claim 15 wherein the means to reconfigure the satellite includes means to remotely adjust the Ku band processing means to direct a bundle of fewer than all of the signals in each of the uplink Ku bands to any one of the downlink Ku bands.

19. The replacement satellite of claim 18 wherein the bundle comprises at least two signals.

20. The replacement satellite of claim 19 wherein the bundle comprises six signals.

21. The replacement satellite of claim 18 wherein the means to remotely adjust the Ku band processing means to direct a bundle of fewer than all of the signals in each of the uplink Ku bands to any one of the downlink Ku bands comprises means to remotely adjust the Ku band processing means to change the frequencies to which the signals are down converted.

22. The replacement satellite of claim 15 wherein the means to reconfigure the satellite includes means to remotely adjust the Ku band processing means to direct some but not all of the signals in one of the Ku uplink bands to any one of the six downlink Ku bands and to direct other signals in that one of the Ku uplink bands to the same or a different one of the six downlink Ku bands.

23. The replacement satellite of claim 22 wherein the means to remotely adjust the Ku band processing means to direct the signals comprises means to remotely adjust the Ku band processing means to change the frequencies to which the signals are down converted.

24. The replacement satellite of claim 15 wherein the means to reconfigure the satellite includes means to remotely adjust the downlink beam from at least one of the Ku band downlink antennas to direct the beam to different locations on Earth.

25. The replacement satellite of claim 15 wherein the means to reconfigure the satellite includes means to remotely adjust the downlink beam from at least one of the C band downlink antennas to direct the beam to different locations on Earth.

26. The replacement satellite of claim 15 wherein the C band processing means can output the amplified, reduced-frequency C band signals as C band downlink signals in the channels of either of the 3.70–4.20 GHz and 3.40–3.70 GHz downlink C bands.

27. The replacement satellite of claim 15 further comprising means to remotely change the footprint of the downlink beam from at least one of the Ku band downlink antennas and from at least one of the C band downlink antennas.

28. The replacement satellite of claim 15 further comprising at least two uplink C band antennas and at least two uplink Ku band antennas, all of the uplink antennas being independently steerable to different locations on Earth.

29. The replacement satellite of claim 28 in which the uplink antennas also function as the downlink antennas.

30. The replacement satellite of claim 15 in which the propulsion system is designed to allow the satellite to make at least three fast moves, each of at least fivedegrees per day, during the design life of the satellite.

31. The replacement satellite of claim 15 wherein the Ku band processing means comprises either a frequency synthesizer or fixed oscillators for down converting the frequencies of the Ku band signals and the C band processing means comprises either a frequency synthesizer or fixed oscillators for down converting the frequencies of the C band signals.

32. The replacement satellite of claim 15 wherein it is designed so that at the end of its design life, the signals of at least twenty-four uplink Ku band channels can be processed by the Ku band processing means and the signals of at least twenty-four uplink C band channels can be processed by the C band processing means.

33. The replacement satellite of claim 15 wherein the telemetry and command subsystem comprises a telemetry sub-subsystem that can transmit on at least two different frequencies and a command sub-subsystem that can receive on at least two different frequencies.

34. The replacement satellite of claim 15 wherein the means to reconfigure the satellite includes means to remotely change the polarity of at least one of the downlink antennas.

35. The replacement satellite of claim 34 wherein the means to remotely change the polarity of at least one of the downlink antennas comprises means to remotely change the polarity from linear to circular or from circular to linear.

36. The replacement satellite of claim 34 wherein the means to remotely change the polarity of at least one of the downlink antennas comprises means to remotely change the polarity from horizontal to vertical or from vertical to horizontal.

37. The replacement satellite of claim 34 wherein the means to remotely change the polarity of at least one of the downlink antennas comprises means to remotely change the polarity from clockwise to counterclockwise or from counterclockwise to clockwise.

38. The replacement satellite of claim 15 wherein some of the Ku band channels have a standard bandwidth.

39. The replacement satellite of claim 15 wherein all of the Ku band channels have a standard bandwidth.

40. The replacement satellite of claim 39 wherein the standard bandwidth is nominally 36 MHz.

41. The replacement satellite of claim 15 further comprising BSS band processing means comprising means for (i) receiving BSS uplink signals at frequencies ranging from 17.3 GHz to 18.1 GHz, (ii) amplifying the BSS signals, (iii) down converting their frequencies, and (iv) outputting those amplified, reduced-frequency BSS band signals as BSS downlink signals in the channels of the bands provided for downlink Ku band signals.

42. A universal replacement communications satellite designed for orbiting the Earth in a geostationary orbit, which can be controlled by an external control system, which is reconfigurable, and which can emulate the communications performance of a substantial percentage of existing geostationary C band and Ku band communications satellites and therefore for which it can be a replacement, the universal replacement satellite being designed to receive uplink C band and Ku band signals and to output C band and Ku band downlink signals, the universal replacement communications satellite comprising:

(a) Ku band processing means for (i) receiving Ku band uplink signals in the channels of three uplink bands, each uplink band having a plurality of uplink Ku band channels, (ii) amplifying the signals, (iii) down converting their frequencies, and (iv) outputting any of those amplified, reduced-frequency Ku band signals as Ku band downlink signals in the channels of any of at least four downlink Ku bands, each downlink Ku band having a plurality of downlink Ku band channels;

(b) two or more Ku band downlink antennas, each antenna capable of outputting a downlink beam comprising Ku band downlink signals, each downlink beam being separately directable to different locations on Earth;

(c) means for directing the Ku band downlink signals to any one of the two or more Ku band downlink antennas;

(d) C band processing means for (i) receiving C band uplink signals in the channels of at least one uplink band, each uplink band having a plurality of uplink C band channels, (ii) amplifying the signals, (iii) down converting their frequencies, and (iv) outputting those amplified, reduced-frequency C band signals as C band downlink signals in the channels of at least one downlink C band, each downlink C band having a plurality of downlink C band channels;

(e) one or more C band downlink antennas, each antenna capable of outputting a downlink beam comprising downlink C band signals, each downlink beam being separately directable to different locations on Earth;

(f) means for directing the C band downlink signals to any one of the one or more C band downlink antennas;

(g) a propulsion subsystem designed to allow the satellite to make at least two fast moves during the design life of the satellite;

(h) a power subsystem to provide electrical power for satellite operation;

(i) a telemetry and command subsystem to allow the satellite to monitor itself and for communicating with the external control system, the subsystem comprising a telemetry sub-subsystem that can transmit on at least two different frequencies and a command sub-subsystem that can receive on at least two different frequencies;

(j) an attitude and orbit control subsystem for helping to properly orient the satellite with respect to Earth;

(k) a thermal control subsystem for helping to maintain the satellite within the proper temperature range for operation; and (l) means to reconfigure the satellite, said means comprising (i) means to remotely adjust the Ku band processing means to direct a bundle of at least two but of fewer than all of the signals in each of the uplink Ku bands to any one of the downlink Ku bands, (ii) means to remotely adjust the downlink beam from at least one of the Ku band downlink antennas to direct the beam to different locations on Earth, (iii) means to remotely adjust the downlink beam from at least one of the one or more C band downlink antennas to direct the beam to different locations on Earth, (iv) means to remotely change the footprint of the downlink beam from at least one of the downlink antennas, and (v) means to remotely change the polarity of at least one of the downlink antennas.

43. The replacement satellite of claim 42 wherein the means to reconfigure the satellite includes means to remotely adjust the Ku band processing means to direct some but not all of the signals in one of the Ku uplink bands to any one of the at least four downlink Ku bands and to direct other signals in that one of the Ku uplink bands to the same or a different one of the at least four downlink Ku bands.

44. The replacement satellite of claim 43 wherein the means to remotely adjust the Ku band processing means to direct the signals comprises means to remotely adjust the Ku band processing means to change the frequencies to which the signals are down converted.

45. The replacement satellite of claim 42 further comprising one or more uplink C band antennas and one or more uplink Ku band antennas, all of the uplink antennas being independently steerable to different locations on Earth.

46. The replacement satellite of claim 45 in which the uplink antennas also function as the downlink antennas.

47. The replacement satellite of claim 42 wherein it is designed so that at the end of its design life, the signals of at least twenty-four uplink Ku band channels can be processed by the Ku band processing means and the signals of at least twenty-four uplink C band channels can be processed by the C band processing means.

48. The replacement satellite of claim 42 wherein the bundle comprises six signals.

49. The replacement satellite of claim 42 wherein the means to remotely adjust the Ku band processing means to direct a bundle of at least two but of fewer than all of the signals in each of the uplink Ku bands to any one of the downlink Ku bands comprises means to remotely adjust the Ku band processing means to change the frequencies to which the signals are down converted.

50. The replacement satellite of claim 42 further comprising means to remotely change the footprint of the downlink beam from at least one of the Ku band downlink antennas.

51. The replacement satellite of claim 42 having at least two downlink C band antennas and further comprising at least two uplink C band antennas and at least two uplink Ku band antennas, all of the uplink antennas being independently steerable to different locations on Earth.

52. The replacement satellite of claim 51 in which the uplink antennas also function as the downlink antennas.

53. The replacement satellite of claim 42 in which the propulsion system is designed to allow the satellite to make at least three fast moves, each of at least five degrees per day, during the design life of the satellite.

54. The replacement satellite of claim 42 wherein the Ku band processing means comprises either a frequency synthesizer or fixed oscillators for down converting the frequencies of the Ku band signals and the C band processing means comprises either a frequency synthesizer or fixed oscillators for down converting the frequencies of the C band signals.

55. The replacement satellite of claim 42 wherein it is designed so that at the start of its design life, the signals of at least thirty-two uplink Ku band channels can be processed by the Ku band processing means and the signals of at least thirty-two uplink C band channels can be processed by the C band processing means.

56. The replacement satellite of claim 42 wherein the means to remotely change the polarity of at least one of the downlink antennas comprises means to remotely change the polarity from linear to circular or from circular to linear.

57. The replacement satellite of claim 42 wherein the means to remotely change the polarity of at least one of the downlink antennas comprises means to remotely change the polarity from horizontal to vertical or from vertical to horizontal.

58. The replacement satellite of claim 42 wherein the means to remotely change the polarity of at least one of the downlink antennas comprises means to remotely change the polarity from clockwise to counterclockwise or from counterclockwise to clockwise.

59. The replacement satellite of claim 42 wherein some of the Ku band channels have a standard bandwidth.

60. The replacement satellite of claim 42 wherein all of the Ku band channels have a standard bandwidth.

61. The replacement satellite of claim 60 wherein the standard bandwidth is nominally 36 MHz.

62. The replacement satellite of claim 42 further comprising BSS band processing means comprising means for (i) receiving BSS uplink signals at frequencies ranging from 17.3 GHz to 18.1 GHz, (ii) amplifying the BSS signals, (iii) down converting their frequencies, and (iv) outputting those amplified, reduced-frequency BSS band signals as BSS downlink signals in the channels of the bands provided for downlink Ku band signals.

63. A method for replacing a geostationary communications satellite handling C band and Ku band signals, the method comprising providing the universal replacement communications satellite of claim 1, placing the replacement satellite in a suitable geostationary slot, and reconfiguring the satellite to emulate the communications performance of the satellite being replaced.

64. The method of claim 63 further comprising placing the replacement satellite in a storage orbit and moving the replacement satellite from its storage orbit to the suitable geostationary slot by means of a combined drift and inclination maneuver.

65. A method for replacing a geostationary communications satellite handling C band and Ku band signals, the method comprising providing the universal replacement communications satellite of claim 15, placing the replacement satellite in a suitable geostationary slot, and reconfiguring the satellite to emulate the communications performance of the satellite being replaced.

66. The method of claim 65 further comprising placing the replacement satellite in a storage orbit and moving the replacement satellite from its storage orbit to the suitable geostationary slot by means of a combined drift and inclination maneuver.

67. A method for replacing a geostationary communications satellite handling C band and Ku band signals, the method comprising providing the universal replacement communications satellite of claim 42, placing the replacement satellite in a suitable geostationary slot, and reconfiguring the satellite to emulate the communications performance of the satellite being replaced.

68. The method of claim 67 further comprising placing the replacement satellite in a storage orbit and moving the replacement satellite from its storage orbit to the suitable geostationary slot by means of a combined drift and inclination maneuver.

\* \* \* \* \*